United States Patent
Choi et al.

(10) Patent No.: US 12,093,679 B2
(45) Date of Patent: Sep. 17, 2024

(54) HOME APPLIANCE AND METHOD FOR OPERATING THE SAME

(71) Applicant: LG ELECTRONICS INC., Seoul (KR)

(72) Inventors: Yongbong Choi, Seoul (KR); Hyojun Im, Seoul (KR); Jiho Lee, Seoul (KR); Woogon Shim, Seoul (KR); Youndong Park, Seoul (KR); Jinbok Lee, Seoul (KR); Yonggyng Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/091,191

(22) Filed: Dec. 29, 2022

(65) Prior Publication Data

US 2023/0385047 A1    Nov. 30, 2023

(30) Foreign Application Priority Data

May 24, 2022    (WO) ................ PCT/KR2022/007317

(51) Int. Cl.
    *G06F 8/65*    (2018.01)
(52) U.S. Cl.
    CPC ...................... *G06F 8/65* (2013.01)
(58) Field of Classification Search
    CPC .......... G06F 8/65; G06F 11/1433; G06F 8/61; G06F 8/71; G06F 8/656; G06F 3/123; G06F 9/4406; G06F 8/658
    See application file for complete search history.

(56) References Cited

U.S. PATENT DOCUMENTS

| | | | |
|---|---|---|---|
| 11,334,337 B2 | 5/2022 | Gupta et al. | |
| 2007/0207800 A1* | 9/2007 | Daley | H04W 8/22 455/425 |
| 2008/0290824 A1* | 11/2008 | Choi | H02J 3/007 318/770 |
| 2011/0035739 A1* | 2/2011 | Harada | G06F 1/32 713/321 |
| 2012/0110747 A1* | 5/2012 | Yum | A47L 15/0063 68/12.23 |
| 2013/0167134 A1* | 6/2013 | Shim | H04W 12/06 717/173 |
| 2017/0205791 A1* | 7/2017 | Yang | D06F 37/04 |
| 2021/0365023 A1* | 11/2021 | Yunoki | G06F 8/65 |
| 2022/0382694 A1* | 12/2022 | Jun | G06F 13/24 |

FOREIGN PATENT DOCUMENTS

| | | |
|---|---|---|
| EP | 3 883 212 A1 | 9/2021 |
| JP | 2012-235215 A | 11/2012 |
| KR | 10-1591289 B1 | 2/2016 |
| KR | 10-1845290 B1 | 4/2018 |
| KR | 10-2018-0082243 A | 7/2018 |
| KR | 10-2019-0101171 A | 8/2019 |

* cited by examiner

Primary Examiner — S. Sough
Assistant Examiner — Cheneca Smith
(74) Attorney, Agent, or Firm — Birch, Stewart, Kolasch & Birch, LLP

(57) ABSTRACT

A home appliance can include a first circuit including a first processor for load control or safety control; and a second circuit connected to the first circuit by wire or wirelessly, configured to control an operation mode based on an operating system, and a second processor configured to perform an upgrade, based on upgrade information received from an external server or a mobile terminal.

17 Claims, 26 Drawing Sheets

(a) T=Ta (b) T=Tb

HOME APPLIANCE AND METHOD FOR OPERATING THE SAME

CROSS-REFERENCE TO RELATED APPLICATION

This application claims priority to and the benefit of Korean Patent Application No. PCT/KR2022/007317, filed in the Republic of Korea on May 24, 2022, the entirety of which is incorporated by reference into the present application.

BACKGROUND OF THE DISCLOSURE

1. Field of the Disclosure

This disclosure relates to a home appliance, and more particularly, to a home appliance and method for operating the same capable of efficiently performing an upgrade of an operation mode by separating load control and operation mode control.

2. Description of the Related Art

A home appliance can be an electric device used in a home, such as a washing machine, a refrigerator, and an air conditioner.

As the functions of home appliance are advanced, various functions are being added to the home appliance. To this end, a function of downloading data from an external server or the like and updating the data is required.

However, since load control data, safety control data, firmware data, application data, etc. are mixed in the same memory in the home appliance, there is a disadvantage in that an efficient update cannot be performed. In addition, there is a disadvantage in that it is difficult to perform an upgrade of a new function.

SUMMARY OF THE DISCLOSURE

The disclosure has been made in view of the above problems, and can provide a home appliance and method for operating the same capable of efficiently performing an upgrade of an operation mode by separating load control and operation mode control.

Meanwhile, the disclosure can further provide a home appliance and method for operating the same capable of efficiently performing firmware update or operation mode upgrade by separating a load control driven based on firmware and an operating mode control executed based on an operating system.

Meanwhile, the disclosure can further provide a home appliance and method for operating the same capable of operating various types of home appliances based on a common platform.

Meanwhile, the disclosure can further provide a home appliance and method for operating the same capable of efficiently performing an update or upgrade by applying a common platform to the home appliance.

In accordance with an aspect of the present invention, a home appliance can include: a first circuit including a first processor for load control or safety control; and a second circuit connected to the first circuit by wire or wirelessly, configured to control an operation mode based on an operating system, and including a second processor configured to perform an upgrade, based on upgrade information received from an external server or a mobile terminal.

Meanwhile, the home appliance according to an embodiment of the present disclosure can further include a third circuit including a third processor configured to control a light emitting diode or a display.

Meanwhile, the second processor can execute the operating system, execute a framework on the operating system, and execute a system application, an application related to the operation mode, or a download application on the framework.

Meanwhile, a part of the operating system and the framework can correspond to a common platform.

Meanwhile, another part of the framework, the system application, the application related to the operation mode, and the download application can correspond to a variable platform.

Meanwhile, the operating system can be executed in common in other types of home appliances.

Meanwhile, the operating system or framework can be updated based on the firmware update information received from the server or the mobile terminal, and the system application, the application related to the operation mode, and the download application can be updated based on software update information received from the server or the mobile terminal.

Meanwhile, the update information is received from the external server or the mobile terminal, and it is preferable that a reception interval of software update information is shorter than a reception interval of firmware update information received from the server or the mobile terminal.

Meanwhile, it is preferable that the software update interval of the second circuit is shorter than the firmware update interval of the first circuit.

Meanwhile, the first circuit can be updated based on firmware update information received from the server or the mobile terminal, and the second circuit can be updated based on the firmware update information or software update information received from the server or the mobile terminal.

Meanwhile, the second processor can control the update of the operating system and the update of the firmware of the first circuit to be performed independently.

Meanwhile, when the update data of the operating system and the firmware update data of the first circuit are received, the firmware of the first circuit can be updated after the operating system is updated.

Meanwhile, the first processor can output an inverter control signal or an inverter command signal for load control.

Meanwhile, the first circuit is configured to perform a remote procedure call communication with the second circuit.

Meanwhile, the first processor is configured to perform a remote procedure call communication with the second processor.

Meanwhile, the second circuit can further include a transceiver configured to perform wireless communication with the server or the mobile terminal.

Meanwhile, the first circuit can further include a memory configured to store firmware for load control or safety control, and the second circuit can further include a memory configured to store the operating system.

Meanwhile, when the transceiver receives firmware update information from the server or the mobile terminal, the second processor can be configured to transmit the firmware update information to the memory in the first circuit, and the memory in the first circuit can be configured to update the firmware, based on the firmware update information.

Meanwhile, the memory in the first circuit can be configured to not update the firmware during the operation mode, and update the firmware after the operation mode is terminated.

Meanwhile, when the transceiver receives software update information from the server or the mobile terminal, the second processor can be configured to transmit the software update information to the memory in the second circuit, and the memory in the second circuit can be configured to update an application, based on the software update information.

Meanwhile, the memory in the second circuit can update an application excluding the operating system and the framework, among software, during the operation mode.

Meanwhile, the memory in the second circuit can update the operating system or the framework, after the operation mode is terminated, without updating the operating system or the framework, during the operation mode.

Meanwhile, in response to the home appliance being a first product, the second processor can be configured to execute an operating system, execute a common framework in a part on the operating system, execute a first product framework in another part on the operating system, and execute a first product-related application on the common framework and the first product framework.

Meanwhile, in response to the home appliance being a second product, the second processor can be configured to execute the operating system, execute a common framework in a part on the operating system, execute a second product framework in another part on the operating system, and execute a second product-related application on the common framework and the second product framework.

Meanwhile, the second processor can be configured to update the first product-related application, during operation of the first product.

Meanwhile, the second processor can be configured to update the operating system or the common framework, after the operation of the first product is terminated.

Meanwhile, it is preferable that the processing speed of the second processor is faster than the processing speed of the first processor.

In accordance with another aspect of the present invention, a home appliance can comprise: a first circuit including a first processor for load control or safety control; and a second circuit connected to the first circuit by wire or wirelessly, configured to control an operation mode based on an operating system, and including a second processor configured to perform application update during the operation mode, based on application update information received from an external server or a mobile terminal.

Meanwhile, when receiving display theme-related update information from the server or the mobile terminal, the second processor can control to display a first display theme at a first time point, perform an update based on the display theme-related update information during operation mode, and display a second display theme corresponding to the display theme-related update information, at a second time point after the first time point.

Meanwhile, in response to firmware update information being received from the server or the mobile terminal, the second processor can be configured to perform a firmware update, after the operation mode is terminated.

Meanwhile, the home appliance can further include a third circuit including a third processor configured to control a light emitting diode or a display.

Meanwhile, in accordance with another aspect of the present invention, a method of operating a home appliance can include: controlling an operating system-based operation mode, based on an operation input; performing update or upgrade during the operation mode, in response to software update information being received from an external server or a mobile terminal; and performing a firmware update, after the operation mode is terminated, in response to firmware update information being received from the server or the mobile terminal.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EMBODIMENTS

Hereinafter, the present disclosure will be described in more detail with reference to the drawings.

The suffixes such as "module" and "unit" can be used to refer to elements or components. Use of such suffixes herein is merely intended to facilitate description of the specification, and the suffixes do not have any special meaning or function. Accordingly, the terms "module" and "unit" can be used interchangeably.

Figure 1:
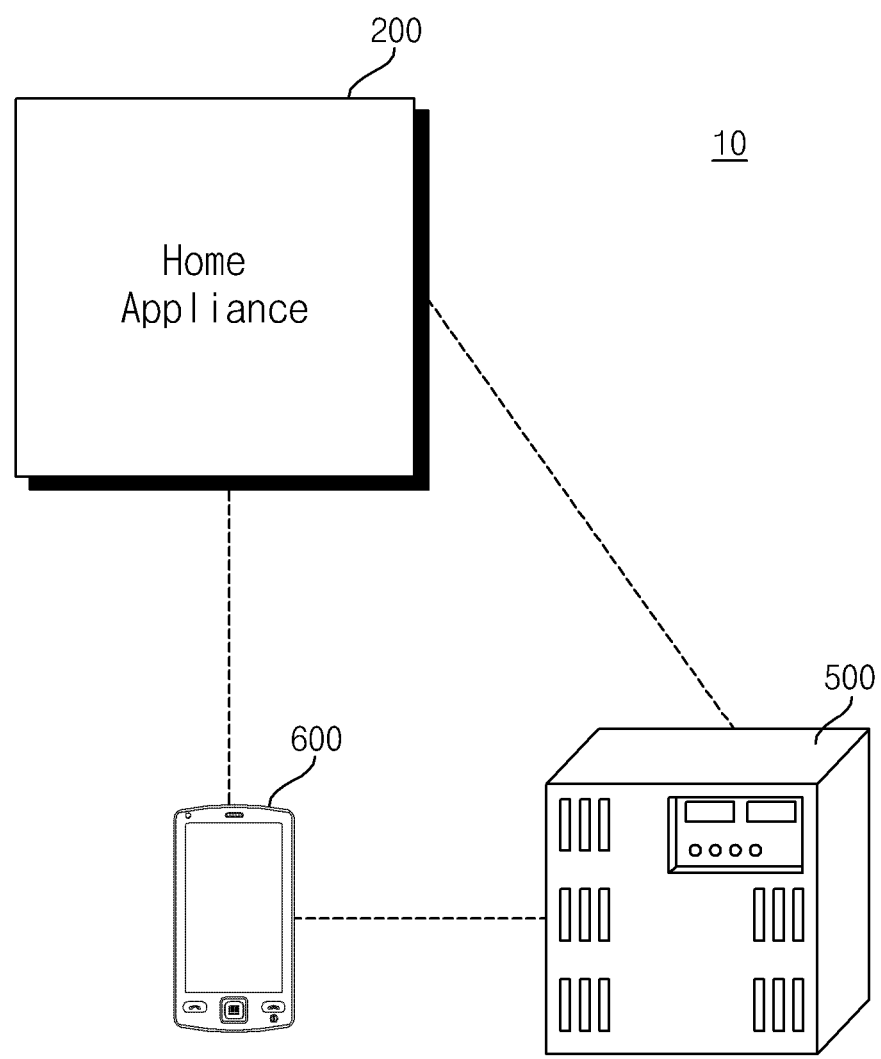
FIG. 1 is an example of a configuration diagram of a home appliance system including a home appliance according to an embodiment of the present disclosure.

FIG. 1 is an example of a configuration diagram of a home appliance system including a home appliance according to an embodiment of the present disclosure.

Referring to FIG. 1, a home appliance system 10 according to an embodiment of the present disclosure can include a home appliance 200, a mobile terminal 600, and a server 500.

In addition, the home appliance system 10 can further include an access point (AP) device for connecting the home appliance 200 to an external network.

The home appliance 200 includes a motor, a magnetron, or a heater for load control and the like.

Meanwhile, the home appliance 200 can include an inverter to convert DC power into AC power for efficient load control.

Meanwhile, the home appliance 200 can execute a system application, an application related to an operation mode, or a download application therein.

Meanwhile, the mobile terminal 600 can perform wireless communication with the home appliance 200 to remotely control the wirelessly connected home appliance 200, or to receive monitoring data from the home appliance 200.

Meanwhile, the server 500 can provide data to the home appliance 200 connected through a network or the like.

For example, the server 500 can provide update information to the home appliance 200 in response to a request of the mobile terminal 600.

As another example, the server 500 can provide update information to the home appliance 200 when necessary, even when there is no request from the mobile terminal 600 or the home appliance 200.

Meanwhile, the update information can include firmware update information, software update information, and the like.

The firmware update information is data for updating the firmware inside the home appliance 200, and can be, for example, update information for load control or safety control of the home appliance 200.

Meanwhile, the software update information can include upgrade information related to a new operation mode. Based on the upgrade information related to the new operation mode, the operation mode can be upgraded.

Meanwhile, the software update information can further include update information on a system application, an application related to an operation mode, or a download application. Based on such update information, an update of the operation mode can be performed.

The firmware update information can include date data for firmware, an operating system, or a framework. Based on the firmware update information, the firmware can be updated.

The home appliance 200 according to an embodiment of the present disclosure includes a first circuit (PBa in FIG. 5A) including a first processor (270 in FIG. 5A) for load control or safety control, and a second circuit (PBc in FIG. 5A) which is connected to the first circuit (PBa in FIG. 5A) by wire or wirelessly, controls the operation mode based on an operating system (710 in FIG. 7A), and includes a second processor (270C in FIG. 5A) to perform an upgrade, based on the upgrade information received from the external server 500 or the mobile terminal 600.

Accordingly, an upgrade for the operation mode can be efficiently accomplished by separating the load control and the operation mode control. Specifically, firmware update or operation mode upgrade can be efficiently accomplished by separating the load control driven based on the firmware and the operation mode control executed based on the operating system 710.

Meanwhile, various examples of the home appliance 200 applied in the present disclosure are possible. This is exemplified through FIGS. 2A to 2D.

FIGS. 2A to 2D are diagrams illustrating various examples of the home appliance of FIG. 1.

Figure 2A:
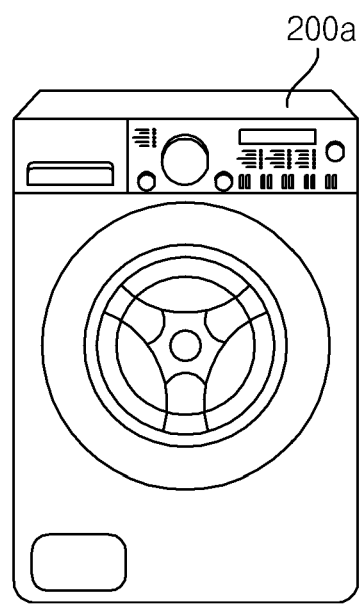
FIGS. 2A to 2E are diagrams illustrating various examples of the home appliance of FIG. 1 according to embodiments of the present disclosure.

FIG. 2A illustrates a washing machine 200a as an example of a home appliance.

When the home appliance 200 is the washing machine 200a, the washing machine 200a can include a washing tub motor and an inverter for rotating the washing tub motor to rotate a washing tub.

Figure 2B:
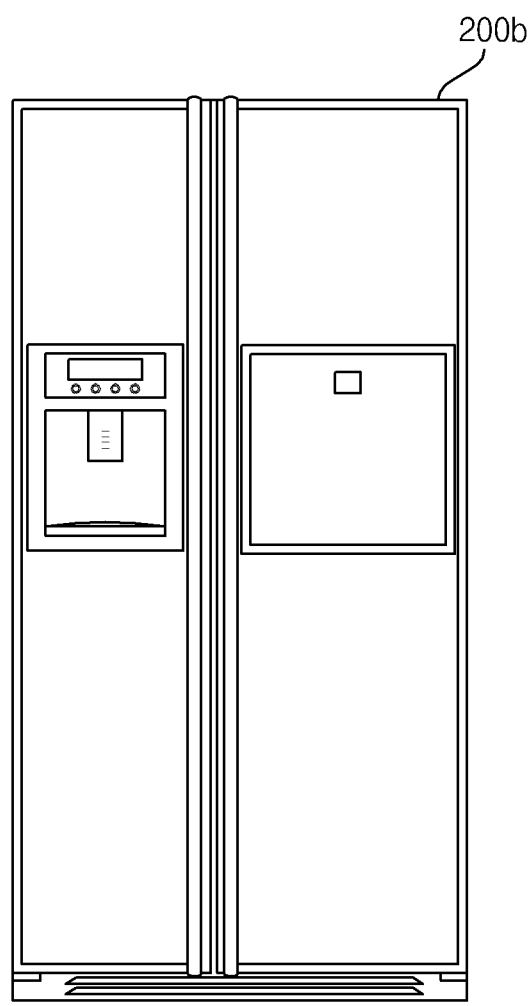

FIG. 2B illustrates a refrigerator 200b as an example of a home appliance.

When the home appliance 200 is the refrigerator 200b, the refrigerator 200b can include a compressor, a compressor motor for operation of the compressor, and an inverter for controlling the compressor motor to supply cold air into the refrigerator.

Figure 2C:
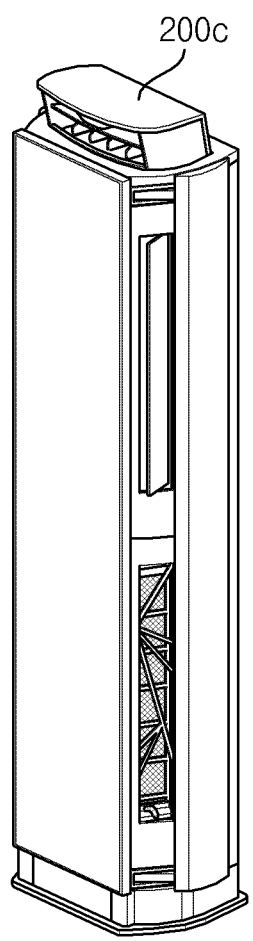

FIG. 2C illustrates an air conditioner 200c as an example of a home appliance.

When the home appliance 200 is the air conditioner 200c, the air conditioner 200c can include a compressor, a compressor motor for operation of the compressor, and an inverter for controlling the compressor motor to supply cold air from the air conditioner.

Figure 2D:
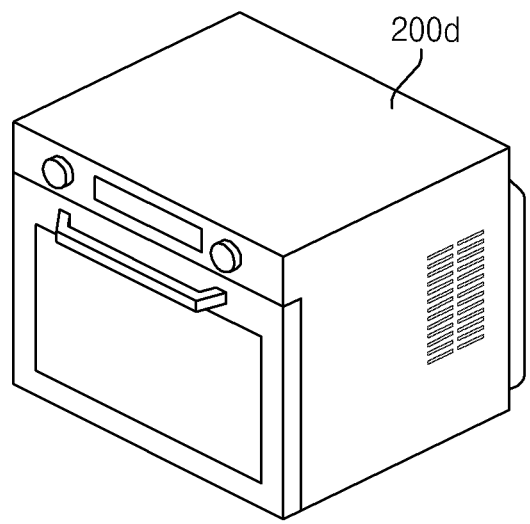

FIG. 2D illustrates a cooking appliance 200d as an example of a home appliance.

When the home appliance 200 is the cooking appliance 200d, the cooking appliance 200d can include a magnetron or a light wave heater and an inverter for controlling the magnetron or light wave heater to heat foods in the cooking appliance.

Figure 2E:
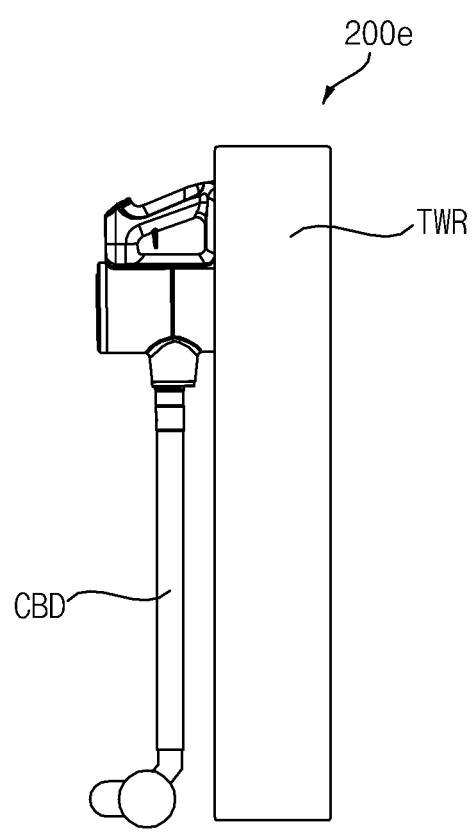

FIG. 2E illustrates a cleaner 200e as an example of a home appliance.

When the home appliance 200 is the cleaner 200e, the cleaner 200e can include a fan motor and an inverter for controlling the fan motor to suck foreign substances inside the cooking appliance.

Meanwhile, according to an embodiment of the present disclosure, various examples of the home appliance 200 such as a washing machine 200a, a refrigerator 200b, an air conditioner 200c, a cooking appliance 200d, and a cleaner 200e, as well as a dryer, a clothes manager, a robot cleaner, and an air purifier, are possible.

Figure 3:
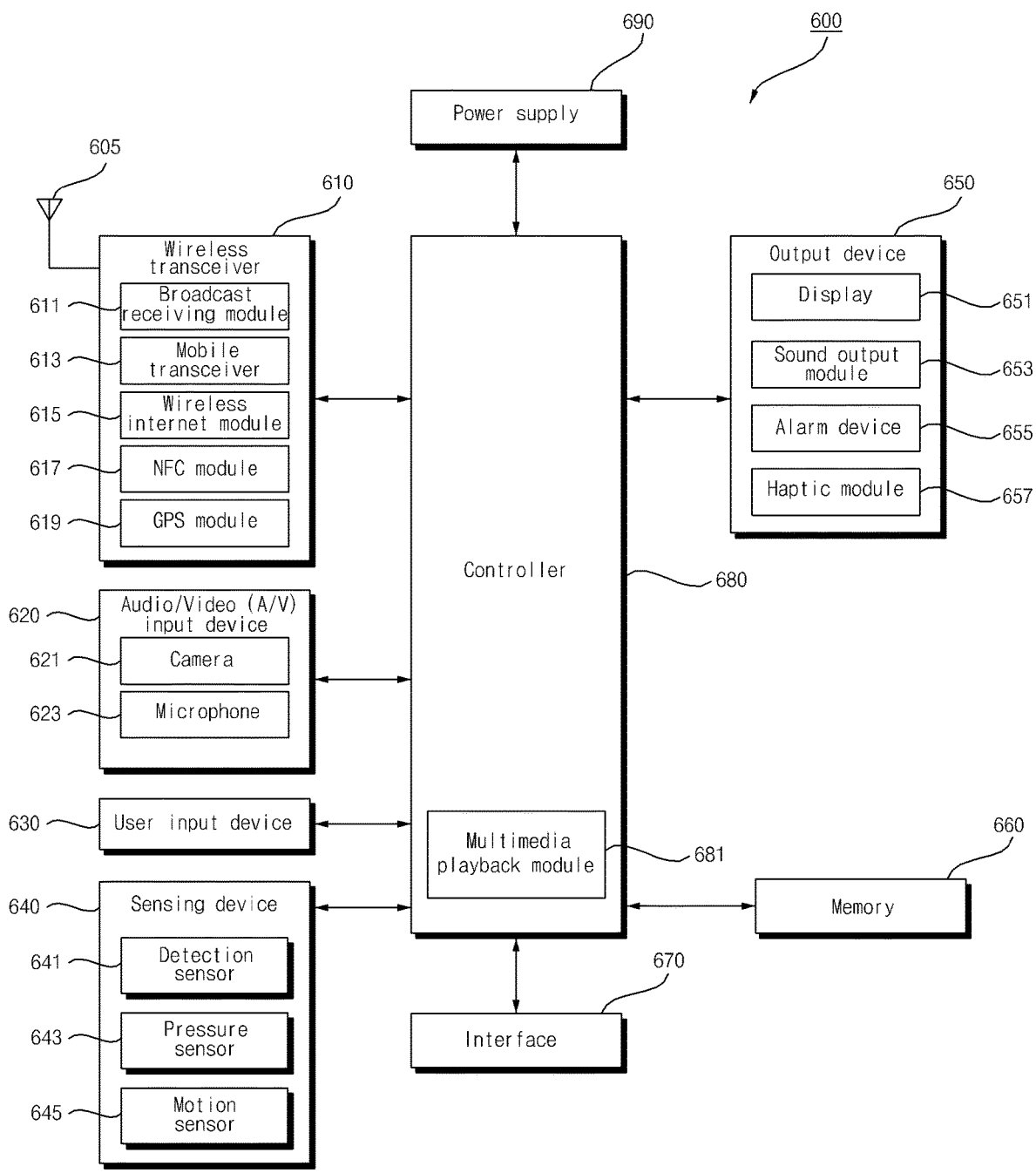
FIG. 3 is an example of an internal block diagram of a mobile terminal of FIG. 1 according to an embodiment of the present disclosure.

FIG. 3 is an internal block diagram of the mobile terminal of FIG. 1.

Referring to FIG. 3, the mobile terminal 600 can include a wireless transceiver 610, an audio/video (A/V) input device 620, a user input device 630, a sensing device 640, an output device 650, a memory 660, an interface 670, a controller 680, and a power supply 690.

Meanwhile, the wireless transceiver 610 can include a broadcast receiving module 611, a mobile transceiver 613, a wireless Internet module 615, an NFC module 617, and a GPS module 619.

The broadcast receiving module 611 can receive at least one of a broadcast signal or broadcast related information from an external broadcast management server through a broadcast channel. In this case, the broadcast channel can include a satellite channel, a terrestrial channel, and the like.

The broadcast signal and/or broadcast related information received through the broadcast receiving module 611 can be stored in the memory 660.

The mobile transceiver 613 can transmit/receive a wireless signal to and from at least one of a base station, an external terminal, or a server on a mobile communication network. Here, the wireless signal can include a voice call signal, a video call signal, or various types of data according to text/multimedia message transmission/reception.

The wireless Internet module 615 refers to a module for wireless Internet access, and the wireless Internet module 615 can be built-in the mobile terminal 600 or can be externally provided to the mobile terminal. For example, the wireless Internet module 615 can perform WiFi-based wireless communication or WiFi Direct-based wireless communication.

The NFC module 617 can perform near field communication. The NFC module 617 can receive data from a corresponding home appliance or transmit data to the corresponding home appliance, when it approaches within a certain distance from a NFC tag or a home appliance in which the NFC module is mounted, that is, when tagging is performed.

In addition, Bluetooth, Radio Frequency Identification (RFID), infrared data association (IrDA), Ultra Wideband (UWB), ZigBee, and the like can be used as a short-range communication technology.

The Global Position System (GPS) module 619 can receive location information from a plurality of GPS satellites.

The Audio/Video (A/V) input device 620 is for inputting an audio signal or a video signal, and can include a camera 621, a microphone 623, and the like.

The user input device 630 generates key input data input by a user to control the operation of the terminal. To this end, the user input device 630 can include a key pad, a dome switch, a touch pad (pressure/capacitance), and the like. In particular, when the touch pad forms a mutual layer structure with the display 651, it can be referred to as a touch screen.

The sensing device 640 can generate a sensing signal for controlling the operation of the mobile terminal 600 by detecting the current state of the mobile terminal 600, such as the open/closed state of the mobile terminal 600, the location of the mobile terminal 600, and the contact of user.

The sensing device 640 can include a detection sensor 641, a pressure sensor 643, and a motion sensor 645. The motion sensor 645 can detect the movement or location of the mobile terminal 600 by using an acceleration sensor, a gyro sensor, a gravity sensor, or the like. In particular, the gyro sensor is a sensor for measuring angular velocity, and can detect a direction (angle) that is turned with respect to a reference direction.

The output device 650 can include a display 651, a sound output module 653, an alarm device 655, and a haptic module 657.

The display 651 displays and outputs information processed by the mobile terminal 600.

Meanwhile, as described above, when the display 651 and the touchpad form a mutual layer structure to configure a touch screen, the display 651 can also be used as an input device capable of inputting information by a user's touch in addition to the output device.

The sound output module 653 outputs audio data that is received from the wireless transceiver 610 or stored in the memory 660. Such a sound output module 653 can include a speaker, a buzzer, and the like.

The alarm device 655 outputs a signal for notifying the occurrence of an event in the mobile terminal 600. For example, the signal can be output in the form of vibration.

The haptic module 657 generates various tactile effects that a user can feel. A representative example of the tactile effect generated by the haptic module 657 is a vibration effect.

The memory 660 can store a program for processing and controlling the controller 680, and can serve to temporarily store the input or output data (e.g. phone book, message, still image, video, etc.).

The interface 670 can serve as an interface with all external devices connected to the mobile terminal 600. The interface 670 can receive data or receive power from such an external device and transmit it to each component inside the mobile terminal 600, and can allow the data inside the mobile terminal 600 to be transmitted to an external device.

The controller 680 can generally control the overall operation of the mobile terminal 600 by controlling the operation of each of the above units. For example, it can perform related control and processing for voice call, data communication, video call, and the like. In addition, the controller 680 can include a multimedia playback module 681 for multimedia playback. The multimedia playback module 681 can be configured as hardware in the controller 680 or can be configured as software separately from the controller 680.

The power supply 690 can receive external power and internal power under the control of the controller 680 to supply power necessary for the operation of each component.

Figure 4A:
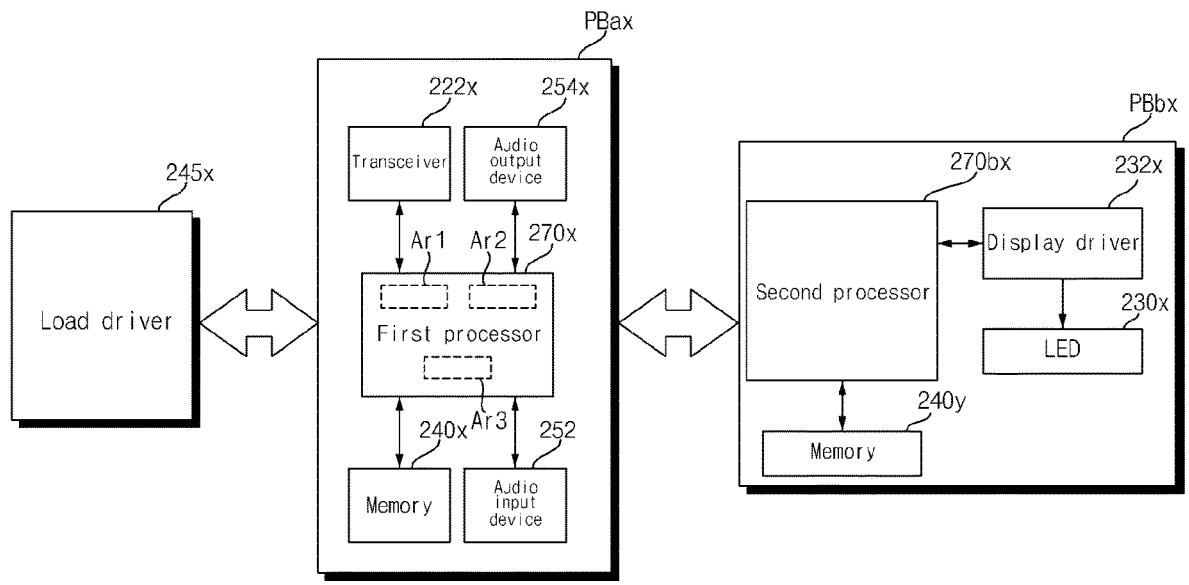
FIG. 4A is an example of an internal block diagram of a home appliance according to an embodiment of the present disclosure.

FIG. 4A is an example of an internal block diagram of a home appliance according to the present disclosure.

Referring to FIG. 4A, the home appliance 200*x* according to the present disclosure includes a first circuit PBax for load control or safety control, and a second circuit PBbx for light emitting diode control.

Meanwhile, the first circuit PBax can output a load control signal or a safety control signal to a load driver 245*x* that operates to drive a load such as a motor or a magnetron.

The first circuit PBax can include a memory 240*x* for storing data related to a load control signal or a safety control signal, a first processor 270*x* for outputting the load control signal or the safety control signal, a transceiver 222*x* for performing communication with an external mobile terminal 600 or a server 500, an audio output device 254*x* for outputting audio, and an audio input device 252 for collecting audio.

Meanwhile, the second circuit PBbx is connected to the first circuit PBax by wire or wirelessly, and can include a second processor 270*bx* for outputting a light emitting diode control signal from the first circuit PBax, in particular, based on a control signal from the first processor 270*x*, a memory 240*y* for storing data related to the light emitting diode control signal, a display driver 232*x* for outputting a light emitting diode driving signal based on the light emitting diode control signal, and a light emitting diode 230*x* for emitting light based on the light emitting diode driving signal.

According to the home appliance 200*x* related to the present disclosure, all of firmware, data related to load control or safety control, system application, application related to operation mode, download application, etc. are stored in the memory 240*x* inside the first circuit PBax.

Meanwhile, when data update is required in the memory 240*x*, there must be a free space in the memory 240*x*, and an address in which data is stored must also be identified.

However, since various data are mixed inside the memory 240*x* inside the first circuit PBax, there is a disadvantage in that it is difficult to efficiently perform data update.

For example, when some data in the memory 240*x* need to be updated, for example, when an application needs to be updated, there is a disadvantage in that all data stored in the memory 240*x* needs to be updated. In addition, there is a disadvantage in that it is difficult to perform the upgrade of the new operation mode.

Meanwhile, although the first processor 270*x* in the first circuit PBax is the main processor of the home appliance 200*x*, since it operates based on firmware rather than on the operating system OS, there is a disadvantage in that the processing speed is slow in comparison with the operating system (OS)-based processing.

Figure 4B:
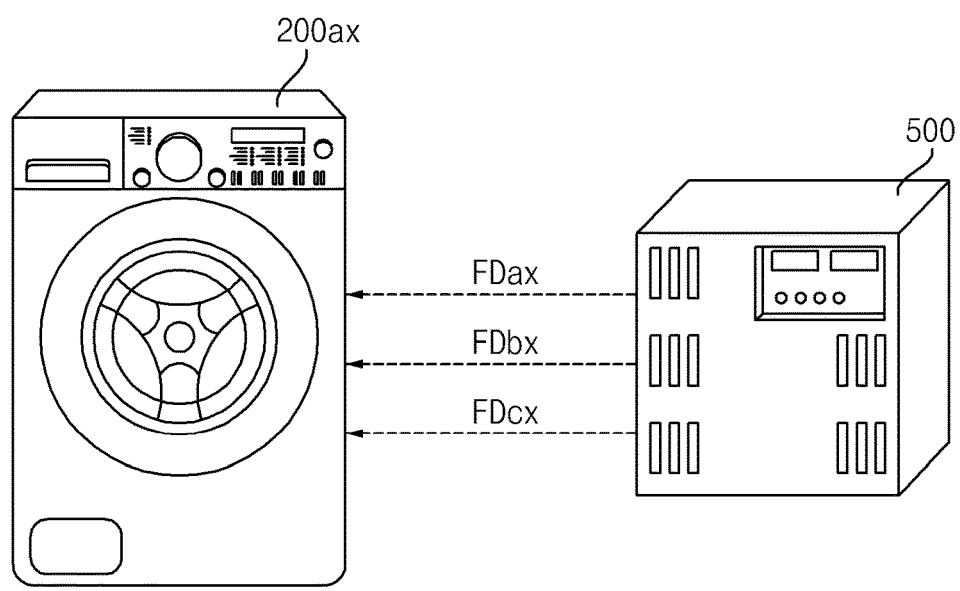
FIGS. 4B and 4C are diagrams for explaining FIG. 4A according to an embodiment of the present disclosure.
Figure 4C:
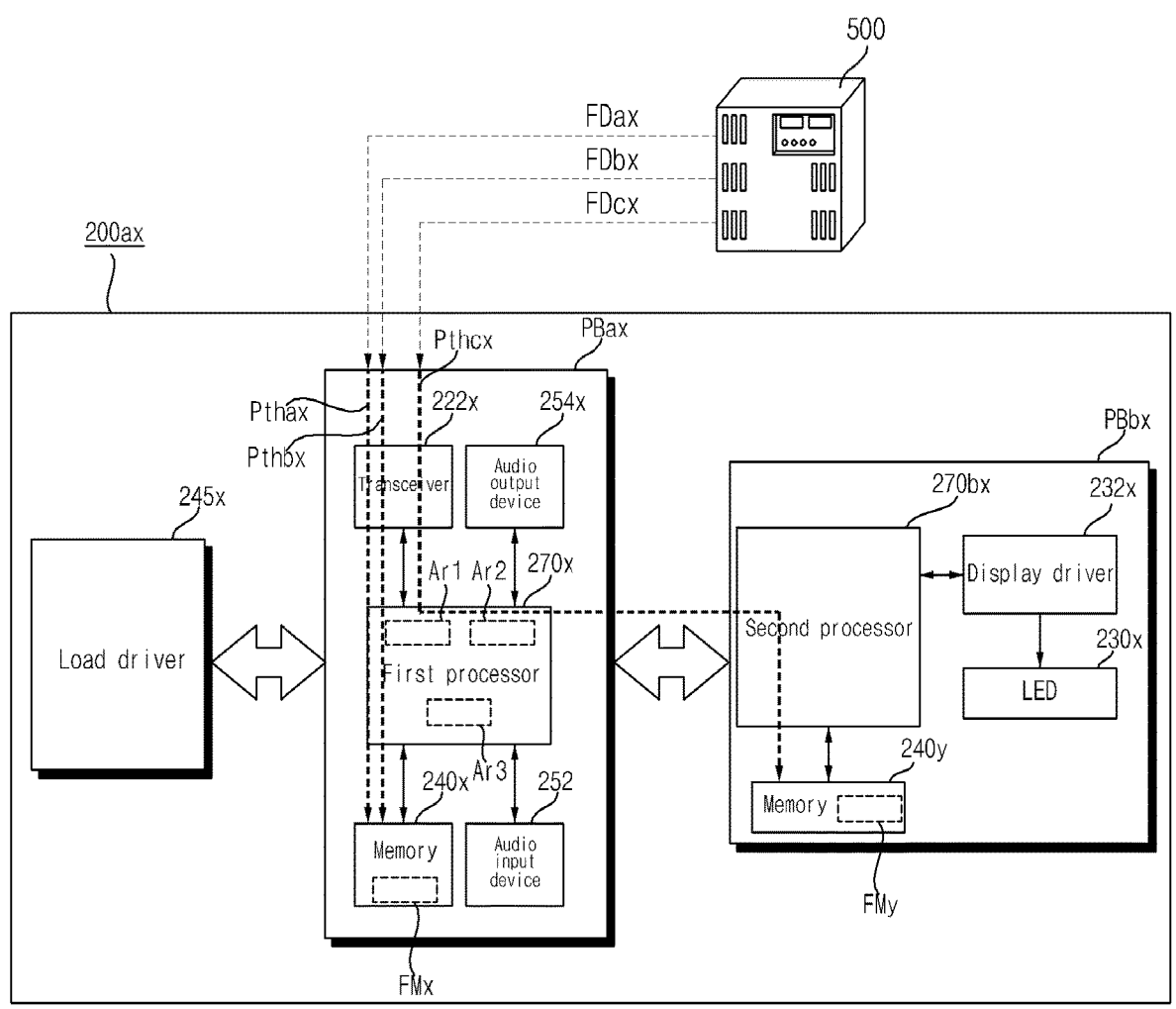

FIGS. 4B and 4C are diagrams for explaining FIG. 4A.

First, FIG. 4B illustrates that the server 500 transmits various data FDax, FDbx, FDcx to the home appliance 200*x*.

For example, among the various data FDax, FDbx, FDcx received from the server 500, a first data FDax can be firmware update information or load control update information, a second data FDbx can be an application update information, and a third data FDcx can be display update information.

Next, FIG. 4C is a diagram illustrating movement path of various data FDax, FDbx, FDcx received in the home appliance 200x.

Referring to FIG. 4C, when the home appliance 200x receives first data FDax that is firmware update information or load control update information, the first data FDax can be stored in the memory 240x, via the transceiver 222x and the first processor 270x, according to a first path Pthax.

Meanwhile, when the home appliance 200x receives the second data FDbx which is application update information, the second data FDbx can be stored in the memory 240x, via the transceiver 222x and the first processor 270x, according to a second path Pthbx.

Meanwhile, the first processor 270x can execute a firmware in an internal first area Ar1, execute a firmware-based application in an internal second area Ar2, and execute a firmware-based load control or safety control in an internal third area Ar3.

Meanwhile, when the home appliance 200x receives the third data FDcx which is display update information, the third data FDcx can be stored in the memory 240y, via the transceiver 222x, the first processor 270x, and the second processor 270bx, according to a third path Pthcx.

As shown in the drawing, since the first data FDax that is firmware update information or load control update information and the second data FDbx that is application update information are all stored in the same memory, i.e., in the memory 240x, there is a disadvantage in that it is difficult to efficiently perform data update.

For example, when some data in the memory 240x need to be updated, in particular, when an application needs to be updated, there is a disadvantage in that all data stored in the memory 240x needs to be updated. Furthermore, there is a disadvantage in that it is difficult to upgrade the new operation mode.

Accordingly, the present disclosure suggests a method for efficiently performing the upgrade by separating the load control and the operation mode control. In addition, a method for efficiently performing firmware update or operation mode upgrade by separating the load control driven based on the firmware and the operation mode control executed based on the operating system is suggested. This will be described with reference to FIG. 5A and below.

Figure 5A:
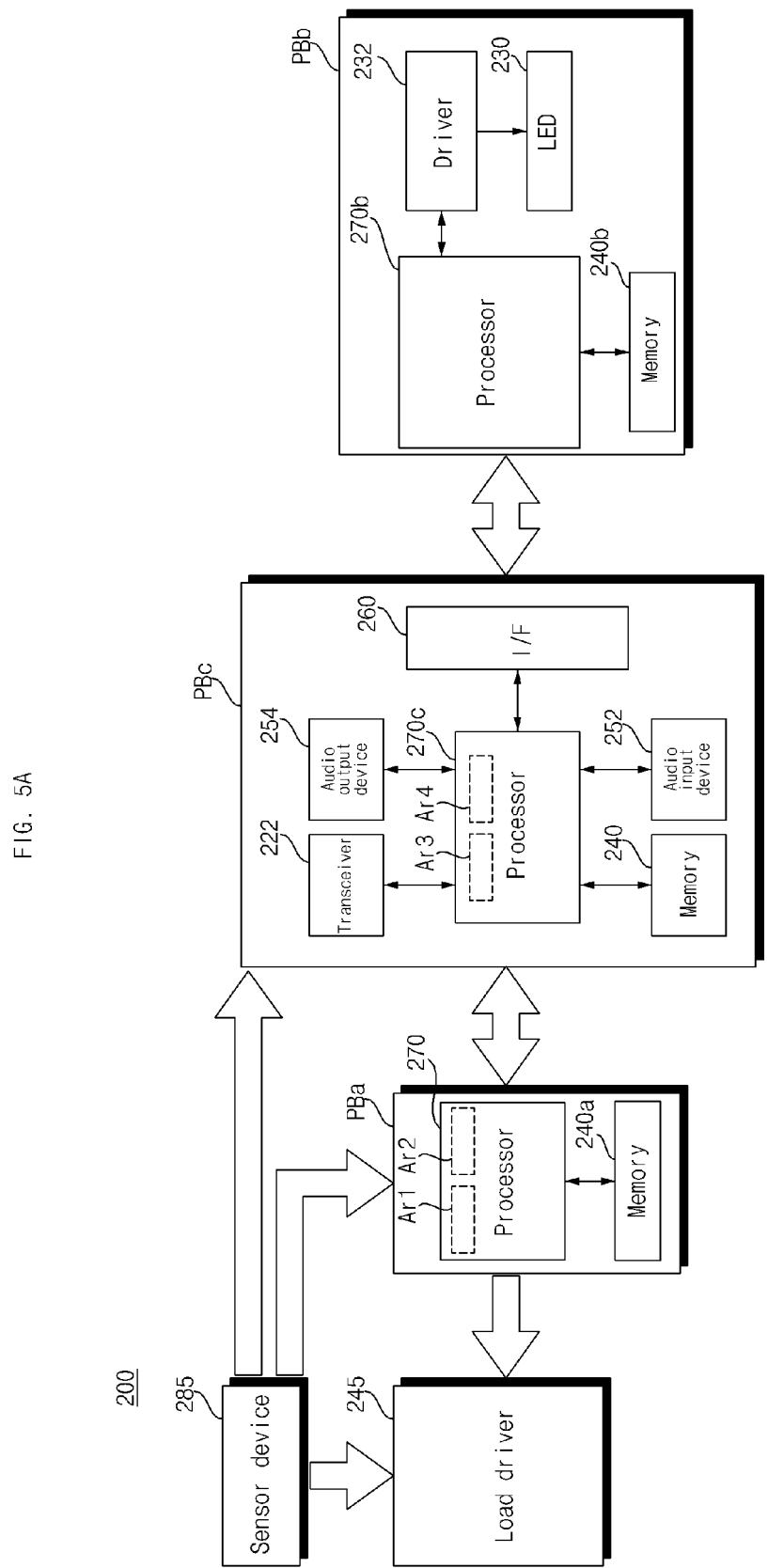
FIG. 5A is an example of an internal block diagram of a home appliance according to an embodiment of the present disclosure.

FIG. 5A is an example of an internal block diagram of a home appliance according to an embodiment of the present disclosure.

Referring to FIG. 5A, the home appliance 200 according to an embodiment of the present disclosure includes a first circuit PBa including a first processor 270 for load control or safety control, and a second circuit PBc that is connected to the first circuit PBa by wire or wirelessly, and includes a second processor 270c which controls an operation mode based on the operating system 710, and performs an upgrade based on the upgrade information received from the external server 500 or the mobile terminal 600.

Specifically, when a hardware device is additionally mounted on the home appliance 200, the second processor 270c can receive upgrade information related to a new operation mode using an additionally mounted hardware device from the external server 500 or the mobile terminal 600, and can perform an upgrade for the new operation mode, based on the upgrade information related to the new operation mode.

For example, when the home appliance 200 is the washing machine 200a and an automatic detergent input device is additionally mounted in the washing machine 200a, the second processor 270c in the washing machine 200a can receive upgrade information related to a new washing machine operation mode in which an automatic detergent input mode is set in relation to the automatic detergent input device, and can perform an upgrade for the new washing machine operation mode, based on the upgrade information related to the new washing machine operation mode.

As another example, when the home appliance 200 is the washing machine 200a, and a new sensor device including a spectral sensor, an acceleration sensor, a gyro sensor, a turbidity sensor, and a humidity sensor is input to the washing machine 200a, the second processor 270c in the washing machine 200a receives upgrade information related to a new washing machine operation mode operable based on various sensor information sensed by a sensor device, and can perform an upgrade for a new washing machine operation mode, based on the upgrade information related to the new washing machine operation mode.

As another example, when the home appliance 200 is an air conditioner 200c, and a new sensor device including a spectral sensor, an acceleration sensor, a gyro sensor, a dust sensor, a gas sensor, and a humidity sensor is disposed around the air conditioner 200c, the second processor 270c in the air conditioner 200c can receive upgrade information related to a new air conditioner operation mode operable based on various sensor information sensed by a sensor device, and can perform an upgrade for the new air conditioner operation mode, based on the upgrade information related to the new air conditioner operation mode.

Meanwhile, even if the home appliance 200 is not additionally equipped with a hardware device, when the upgrade information related to a new operation mode in software is received from the external server 500 or the mobile terminal 600, the second processor 270c can perform an upgrade for the new operation mode based on the upgrade information related to the new operation mode.

For example, when the home appliance 200 is the refrigerator 200b and a new rapid cooling operation mode is generated in software, the second processor 270c in the refrigerator 200b can receive upgrade information related to the new rapid cooling operation mode, and perform an upgrade for the new rapid cooling operation mode, based on the upgrade information related to the new rapid cooling operation mode.

As another example, when the home appliance 200 is the cooking appliance 200d and a new rapid thawing operation mode is generated in software, the second processor 270c in the cooking appliance 200d can receive upgrade information related to the new rapid thawing operation mode, and perform an upgrade for the new rapid thawing operation mode, based on the upgrade information related to the new rapid thawing operation mode.

As another example, when the home appliance 200 is the cleaner 200e and a new motor speed variable operation mode is generated in software, the second processor 270c in the cleaner 200e can receive upgrade information related to the new motor speed variable operation mode, and can perform an upgrade for the new motor speed variable operation mode, based on the upgrade information related to the new motor speed variable operation mode.

Accordingly, the home appliance 200 according to an embodiment of the present disclosure can be called as an upgradable home appliance that can be upgraded to a new operation mode, based on a change in hardware or software.

Meanwhile, the home appliance 200 according to an embodiment of the present disclosure can perform an update related to a setting change for an existing operation mode, in addition to an upgrade for a new operation mode.

In this specification, it is described that the upgrade of the operation mode means that a new operation mode is generated to be installed or executed, and the update of the operation mode means that setting or data change is performed for the existing operation mode.

Meanwhile, the home appliance 200 according to an embodiment of the present disclosure can further include a third circuit PBb having a third processor 270b for controlling the light emitting diode 230 or the display 280. Accordingly, the light emitting diode 230 or the display 280 can be controlled through a separate third circuit PBb.

Meanwhile, the first circuit PBa can output a load control signal or a safety control signal to a load driver 245 that operates to drive a load such as a motor or a magnetron.

The load control signal can be divided into a main load control signal for controlling a load, which is a component having the largest power consumption, and a sub load control signal for controlling other components.

For example, the main load can be a washing machine motor in the case of the washing machine 200a, can be a compressor motor in the case of the refrigerator 200b and the air conditioner 200c, can be a magnetron or a light wave heater in the case of the cooking appliance 200d, and can be a fan motor in the case of the cleaner 200e.

Meanwhile, the sub-load can be a steam device or a fan motor in the case of the washing machine 200a, can be a fan motor or a defrost heater in the case of the refrigerator 200b and the air conditioner 200c, and can be a fan motor in the case of the cooking appliance 200d.

Meanwhile, the safety control signal can be a door lock control signal or a shutdown control signal for preventing overheating of motor, in the case of the washing machine 200a, can be a shutdown control signal for preventing overheating of motor, in the case of the refrigerator 200b and the air conditioner 200c, can be a shutdown control signal for preventing overheating of a magnetron or light wave heater, in the case of the cooking appliance 200d, and can be a shutdown control signal for preventing overheating of motor, in the case of the cleaner 200e.

Meanwhile, the first circuit PBa is connected to the second circuit PBc by wire or wirelessly, and can output a load control signal or a safety control signal, based on a control signal from the second circuit PBc, in particular, from the second processor 270c.

Meanwhile, the first circuit PBa includes a first processor 270 that outputs a load control signal or a safety control signal, and a memory 240a that stores data related to the load control signal or the safety control signal.

Meanwhile, the first processor 270 can output an inverter control signal or an inverter command signal for load control, particularly, for main load control. Accordingly, the load control or safety control can be directly or indirectly performed by using the first processor 270 separated from the second processor 270c.

For example, when the home appliance 200 is the washing machine 200a, the first processor 270 in the washing machine 200a can output an inverter control signal or an inverter speed command signal for rotation of the washing machine motor.

As another example, when the home appliance 200 is the refrigerator 200b, the first processor 270 in the refrigerator 200b can output an inverter control signal or an inverter speed command signal for rotation of the compressor motor.

As another example, when the home appliance 200 is the air conditioner 200c, the first processor 270 in the air conditioner 200c can output an inverter control signal or an inverter speed command signal for rotation of the compressor motor.

As another example, when the home appliance 200 is the cooking appliance 200d, the first processor 270 in the cooking appliance 200d can output an inverter control signal for controlling a magnetron or a light wave heater.

Meanwhile, a sensor device 285 including a temperature sensor and a current sensor can transmit current information to the load driver 245 or the first circuit PBa, and transmit temperature information or the like to the second circuit PBc.

Accordingly, the first circuit PBa can perform load control or safety control based on current information or the like, and the second circuit PBc can generate an operation mode control signal based on temperature information or the like.

Meanwhile, the sensor device 285 can further include a camera or the like, an image signal from the camera or the like can be transmitted to the second circuit PBc, and the second circuit PBc can generate an operation mode control signal based on the image signal from the camera or the like.

Meanwhile, the sensor device 285 is a separate device provided with a plurality of sensors, and can include a spectral sensor, an acceleration sensor, a gyro sensor, a turbidity sensor, and a humidity sensor, and signals sensed by the plurality of sensors can be transmitted to the second circuit PBc, and the second circuit PBc can generate an operation mode control signal based on the plurality of sensing signals.

Meanwhile, the sensor device 285 is a separate device provided with a plurality of sensors, and can include a spectral sensor, an acceleration sensor, a gyro sensor, a dust sensor, a gas sensor, and a humidity sensor, signals sensed by the plurality of sensors can be transmitted to the second circuit PBc, and the second circuit PBc can generate an operation mode control signal based on a plurality of sensing signals.

Meanwhile, the third circuit PBb is connected to the second circuit PBc by wire or wirelessly, and can include a third processor 270b that outputs a light emitting diode control signal, based on a control signal from the second circuit PBc, in particular, from the second processor 270c, a memory 240b for storing data related to the light emitting diode control signal, a display driver 232 for outputting a light emitting diode driving signal based on the light emitting diode control signal, and a light emitting diode 230 which emits light based on the light emitting diode driving signal.

The second circuit PBc is disposed between the first circuit PBa and the third circuit PBb, and can be connected to the first circuit PBa and the third circuit PBb by wire or wirelessly.

The second circuit PBc can include a second processor 270c for performing an operation mode control, based on the operating system 710 of the home appliance 200, a memory 240 for storing data for the operating system 710 and the operation mode control, a transceiver 222 for performing communication with the external mobile terminal 600 or server 500, an audio output device 25 for outputting audio, an audio input device 252 for collecting audio, and an interface 260 for inter-processor communication (IOC) with the first circuit PBa or the third circuit PBb.

Meanwhile, unlike FIG. 4A, the second circuit PBc includes a transceiver 222 for performing wireless communication with the server 500 or the mobile terminal 600, so that an external data can be received or data can be transmitted to the outside through the second circuit PBc.

According to the home appliance 200 of FIG. 5A, data related to firmware, load control, or safety control is stored in the memory 240a inside the first circuit PBa, and an operating system OS, a system application, an application related to an operation mode, a download application, and the like are stored in the memory 240 inside the second circuit PBc.

That is, unlike FIG. 4A, firmware, data related to load control or safety control, and an operating system OS, a system application, an application related to an operation mode, a download application, and the like are separately stored.

That is, based on the update information received through the transceiver 222 performing wireless communication with the mobile terminal 600, the update of data related to load control or safety control, and the update of the operating system OS, system application, application related to an operation modes, and download application can be separately performed.

Accordingly, the upgrade of the operation mode can be efficiently performed by separating the load control and the operation mode control. Specifically, the update of firmware or the upgrade of operation mode can be efficiently performed by separating the load control driven based on the firmware and the operation mode control executed based on the operating system 710. In particular, an update related to the operation mode can be easily and efficiently performed. In addition, the operating system 710 executed in the second processor 270c can be updated.

For example, when an application in the memory 240 needs to be updated, only a corresponding application among data stored in the memory 240 can be updated, thereby efficiently performing an update.

Meanwhile, unlike FIG. 4A, since the second processor 270c inside the second circuit PBc operates as a main processor of the home appliance 200, while operating based on the operating system OS rather than on the firmware, there is an advantage in that the operating system (OS)-based processing speed is considerably faster than the firmware-based processing.

Meanwhile, it is preferable that the processing speed of the second processor 270c is higher than that of the first processor 270 or the third processor 270b. Accordingly, the operation mode control executed based on the operating system 710 can be efficiently performed.

Meanwhile, the first circuit PBa or the third circuit PBb can perform a remote procedure call communication with the second circuit PBc, which is an example of inter-processor communication (IPC).

That is, the second processor 270c in the second circuit PBc can perform a remote procedure call communication with the second circuit PBc, which is an example of inter-processor communication (IPC) with the first processor 270 in the first circuit PBa or the third processor 270b in the third circuit PBb. Thus, an efficient communication can be performed by using inter-processor communication (IPC).

Meanwhile, it is preferable that the memory 240 of the second circuit PBc in FIG. 5A has a larger storage space than the storage space of the memory 240a of the first circuit PBa or the memory 240b of the third circuit PBb.

Accordingly, among the update information received from the transceiver 222, update information to be transferred to the memory 240a of the first circuit PBa or the memory 240b of the third circuit PBb, not to the memory 240 of the second circuit PBc can be temporarily stored by the memory 240 of the second circuit PBc, and then transferred to the memory 240a of the first circuit PBa or the memory 240b of the third circuit PBb. Accordingly, the update can be efficiently performed.

Figure 5B:
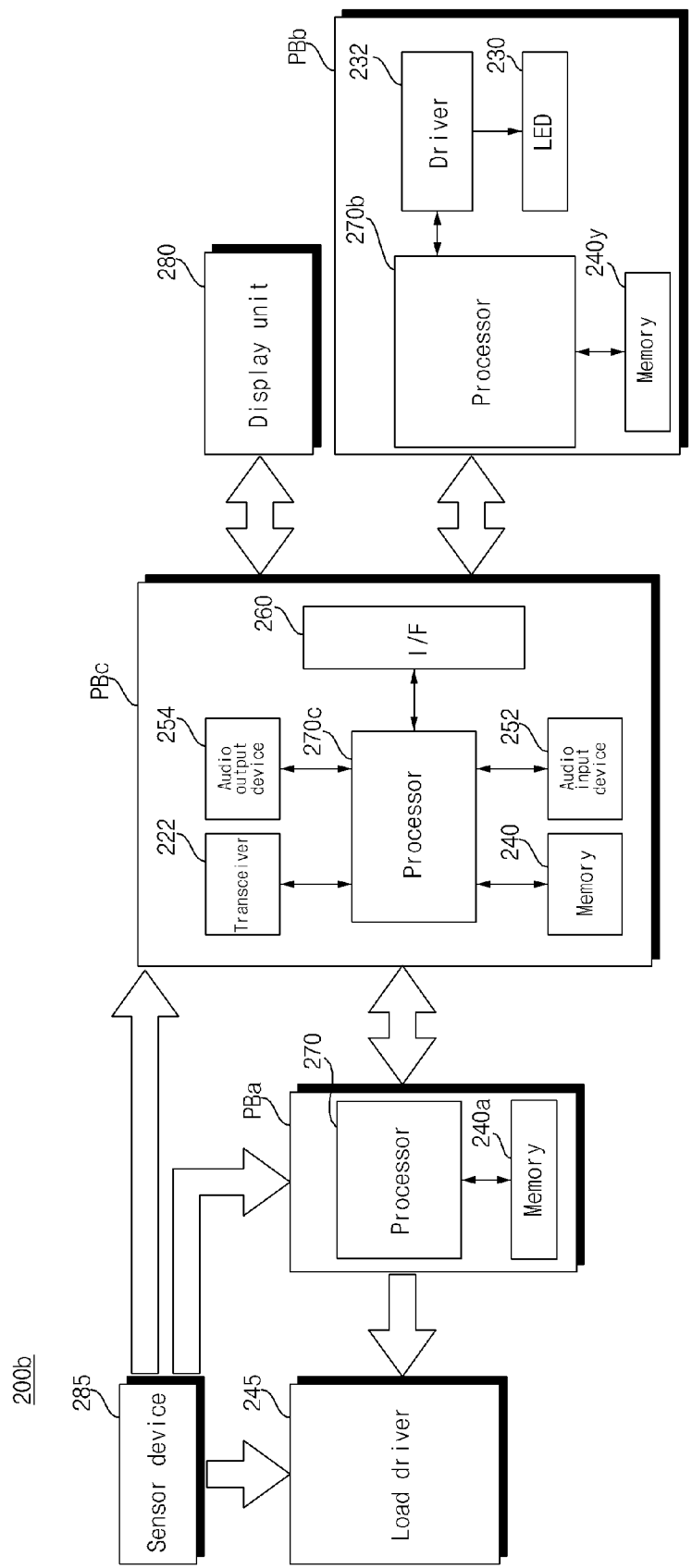
FIG. 5B is another example of an internal block diagram of a home appliance according to an embodiment of the present disclosure.

FIG. 5B is another example of an internal block diagram of a home appliance according to an embodiment of the present disclosure.

Referring to FIG. 5B, a home appliance 200b according to an embodiment of the present disclosure is similar to the home appliance 200 of FIG. 5A, but there is a difference in that a separate display 280 is further provided in addition to the light emitting diode 230.

The separate display 280 can be an LCD display, an OLED display, or the like.

In the following, only a difference from FIG. 5A is described.

The third processor 270b inside the third circuit PBb can operate to control the light emitting diode 230 or the display 280.

For example, the third processor 270b can output a light emitting diode control signal, based on a control signal from the second processor 270c, and the display driver 232 can output a light emitting diode driving signal to the light emitting diode 230, based on the light emitting diode control signal.

Meanwhile, the display 280 can be driven, based on a display control signal output from the second processor 270c.

Meanwhile, unlike the drawing, the third processor 270b inside the third circuit PBb can output a display control signal for controlling the display 280 to the display 280, based on a control signal from the second processor 270c.

FIGS. 6A to 10D are diagrams for explaining the operation of the home appliance of FIG. 5A or 5B.

Figure 6A:
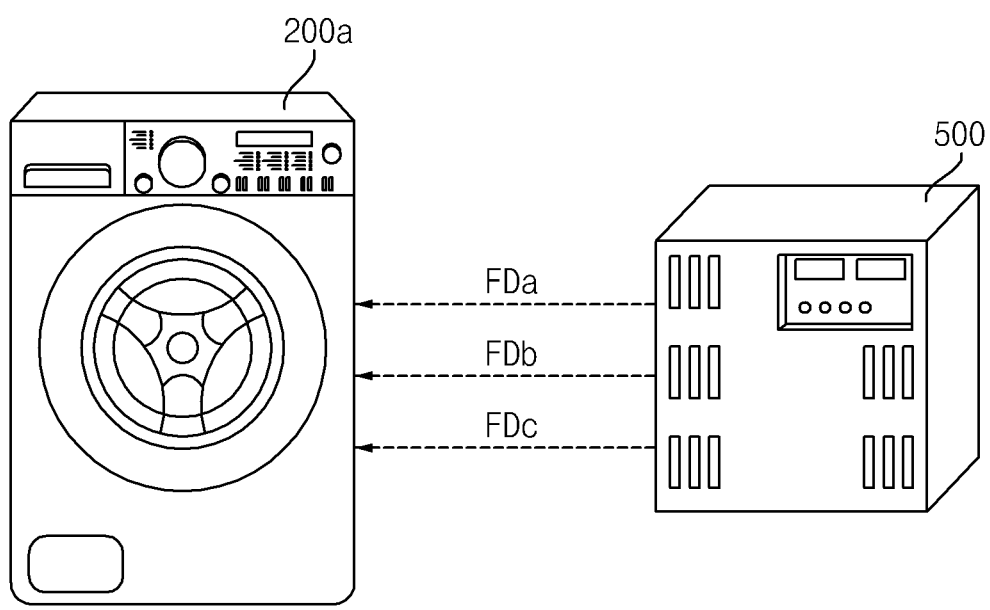
FIGS. 6A to 10D are diagrams for explaining the operation of the home appliance of FIG. 5A or 5B according to embodiment of the present disclosure.

First, FIG. 6A illustrates that the server 500 transmits various data FDax, FDbx, FDc to the home appliance 200.

For example, among the various data FDax, FDbx, FDc received from the server 500, a first data FDa can be firmware update information or load control update information, and a second data FDb can be an application update information, and a third data FDc can be display update information.

Figure 6B:
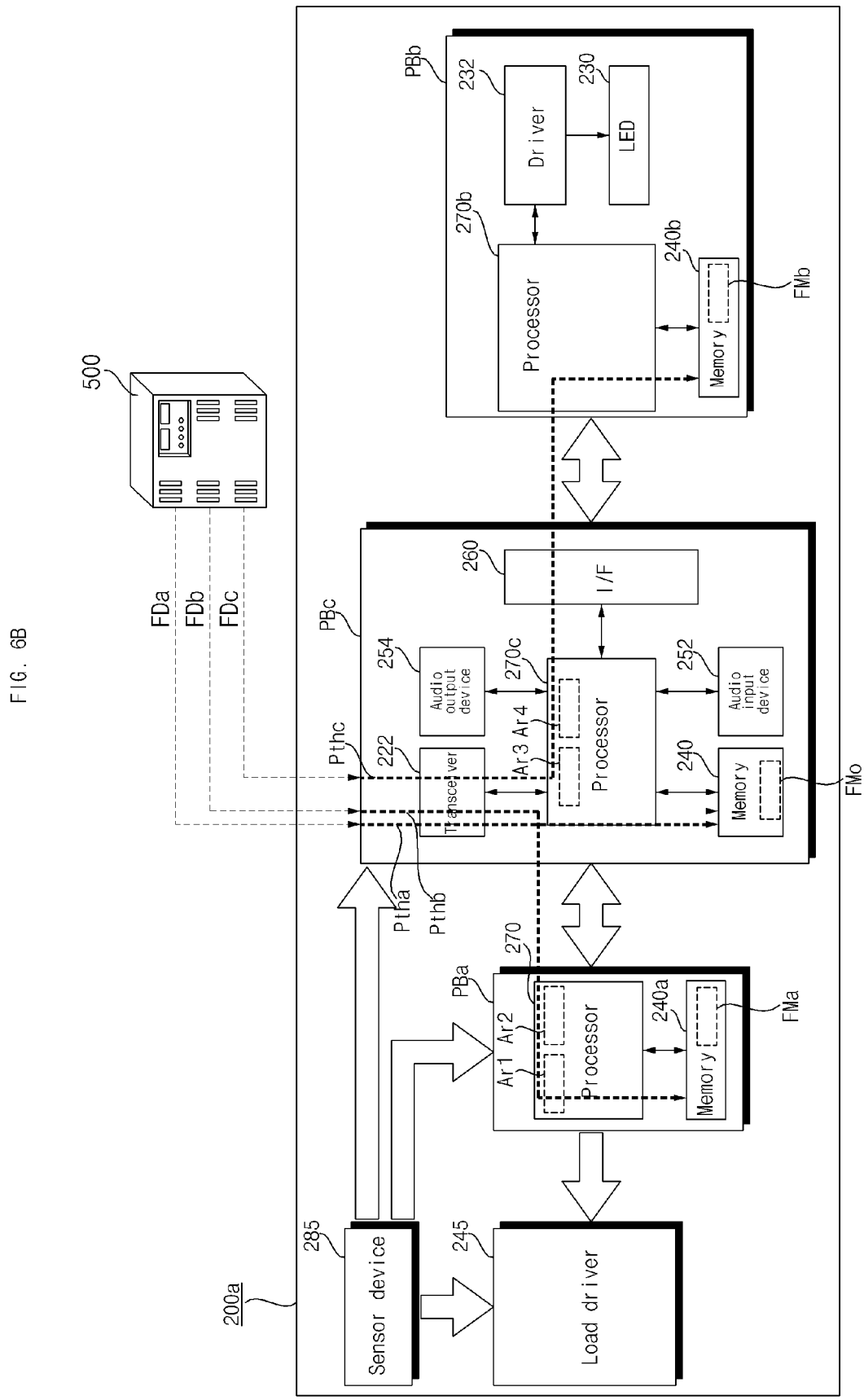

Next, FIG. 6B is a diagram illustrating movement path of various data FDax, FDbx, FDc received by the home appliance 200.

Referring to the drawing, when the home appliance 200 receives first data FDa that is firmware update information or load control update information, the first data FDa can be stored in the memory 240a inside the first circuit PBa, via the transceiver 222 and the second processor 270c inside the second circuit PBc, and the first processor 270 inside the first circuit PBa, according to a first path Ptha.

Meanwhile, the first processor 270 inside the first circuit PBa can execute the firmware in the internal first area Ar1, and execute the firmware-based load control or safety control in the internal second area Ar2.

Meanwhile, when the home appliance 200 receives the second data FDb as application update information, the second data FDb can be stored in the memory 240 inside the second circuit PBc via the transceiver 222 and the second processor 270c inside the second circuit PBc according to a second path Pthb.

Similarly, when the home appliance 200 receives the operating system update information or the framework update information, the operating system update information or the framework update information can be stored in the memory 240 inside the second circuit PBc, via the transceiver 222 and the second processor 270c inside the second circuit PBc, according to the second path Pthb.

Meanwhile, when the home appliance 200 receives the third data FDc that is display update information, the third data FDc can be stored in the memory 240y inside the third circuit PBb, via the transceiver, the second processor 270c inside the second circuit PBc, and the third processor 27b inside the third circuit PBb, according to a third path Pthc 222.

As shown in the drawing, the first data FDa, which is firmware update information or load control update information, is stored in the memory 240a inside the first circuit PBa, and the application update information is separately stored in the memory 240 inside the second circuit PBc, so that data update can be performed efficiently.

In particular, the update of data stored in the memory 240 inside the second circuit PBc can be performed efficiently and frequently.

For example, when an application inside the memory 240 needs to be updated, only the application in the memory 240 inside the second circuit PBc, not the entire memory 240x of FIG. 4C, can be selectively updated, so that update can be performed efficiently.

In addition, the application can be updated during the operation mode of the home appliance 200, by separately storing application data in the memory 240 inside the second circuit PBc. Accordingly, the application update can be performed immediately.

Meanwhile, the firmware for load control or safety control is stored in a partial area Fina of the memory 240a in the first circuit PBa, the firmware for display control is stored in a partial area Fmb of the memory 240b in the third circuit PBb, and the operating system 710 and the like are stored in a partial area FMo of the memory 240 in the second circuit PBc, thereby efficiently performing firmware update or operation mode upgrade by separating the load control driven based on the firmware and the operation mode control executed based on the operating system 710.

Figure 7A:
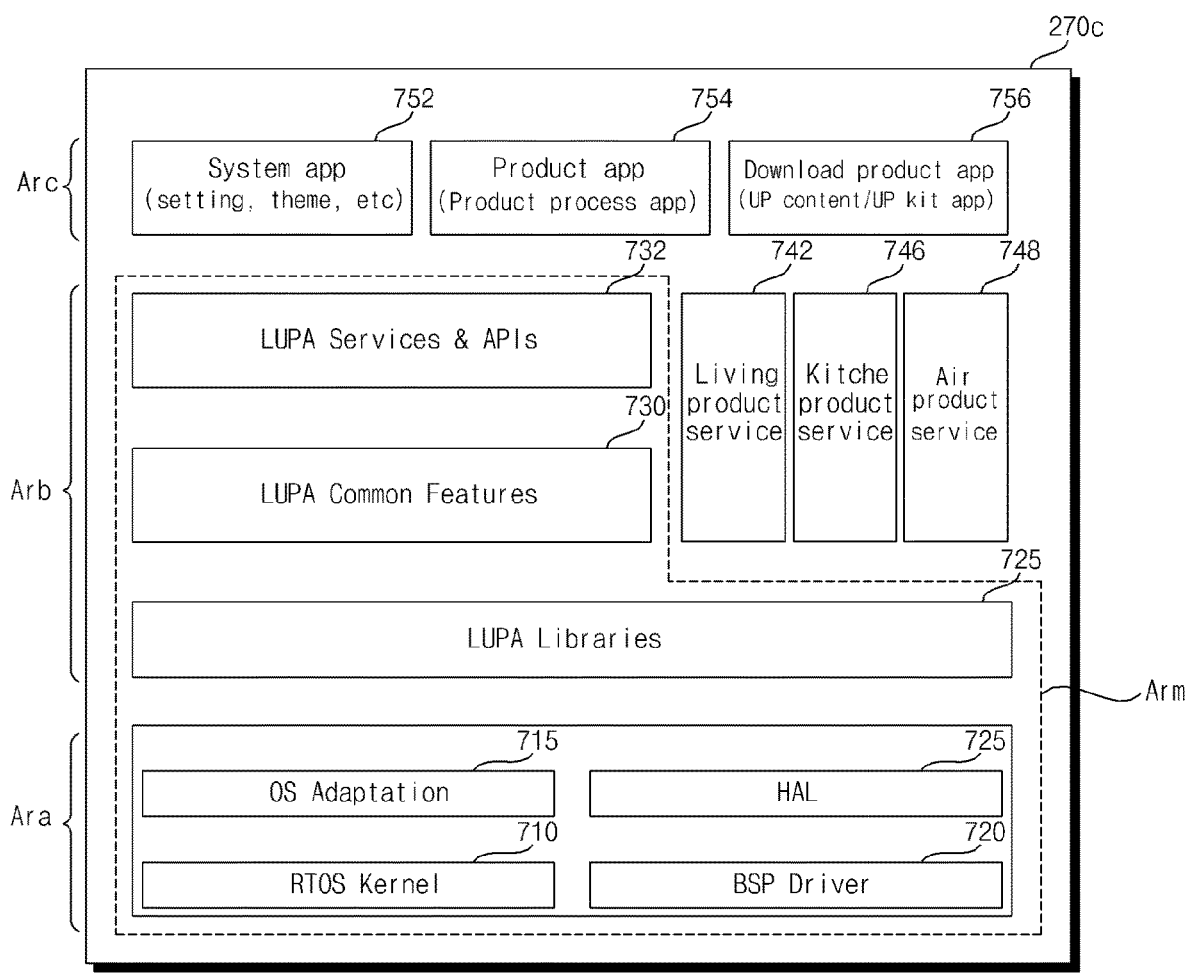

FIG. 7A is a diagram illustrating a platform architecture executed by the second processor 270c inside the second circuit PBc.

Referring to FIG. 7A, the platform executed by the second processor 270c inside the second circuit PBc can be divided into a board support package layer (Ara), a framework layer (Arb) on the board support package layer (Ara), and an application layer (Arc) on the framework layer (Arb).

The board support package layer (Ara) can include a Real Time Operating System (RTOS) kernel 710, an Operating System Adaptation layer 715 executed in the Real Time Operating System kernel 710, a board support package driver 720, and a hardware abstraction layer 722.

The framework layer (Arb) can include an upgradable platform library 725, a common feature layer 730 on the upgradeable platform library 725, a service on the common feature layer 730 and an application program interface (API) layer 732, a living product service framework 742, a kitchen product framework 746, and an air product framework 748.

Here, the living product service framework 742 can include a washing machine framework, a dryer framework, a clothing manager framework, and the like.

Meanwhile, the kitchen product framework 746 can include a cooking appliance framework, a water purifier framework, and the like.

The application layer Arc can include a system application 752 that is executed on the framework layer Arb, an application 754 related to an operation mode, or a download application 756.

As shown in the drawing, the second processor 270c can execute the operating system 710, execute a framework Arb on the operating system 710, and can execute a system application 752, an application 754 related to the operation mode, or a download application 756 on the framework Arb. Accordingly, the update of the framework Arb or the application can be performed easily and efficiently based on the operating system 710.

Meanwhile, in an embodiment of the present disclosure, a common platform Arm applicable to various home appliances is suggested.

The operating system 710 and a part 725, 730, 732 of the framework Arb can correspond to the common platform Arm. Specifically, the operating system 710 can be commonly executed by other types of home appliances 200. Accordingly, various types of home appliances 200 can be operated based on the common platform. In addition, an update or upgrade can be efficiently performed by applying a common platform to the home appliance 200.

Meanwhile, other part 742, 746, 748 of the framework Arb, the system application 752, the application 754 related to the operation mode, and the download application 756 can correspond to a variable platform. Accordingly, the update of the variable platform or the upgrade of the operation mode can be efficiently performed.

As shown in FIG. 7A, the entire board support package layer Ara including the real-time operating system kernel 710, and a part, among the framework layer Arb, excluding the living product service framework 742, the kitchen product framework 746, and the air product framework 748 can be set as a common platform Arm applicable to various home appliances.

Accordingly, various types of home appliances 200 can be operated based on the common platform Arm. In addition, the update can be efficiently performed by applying the common platform Arm to the home appliance 200.

Figure 7B:
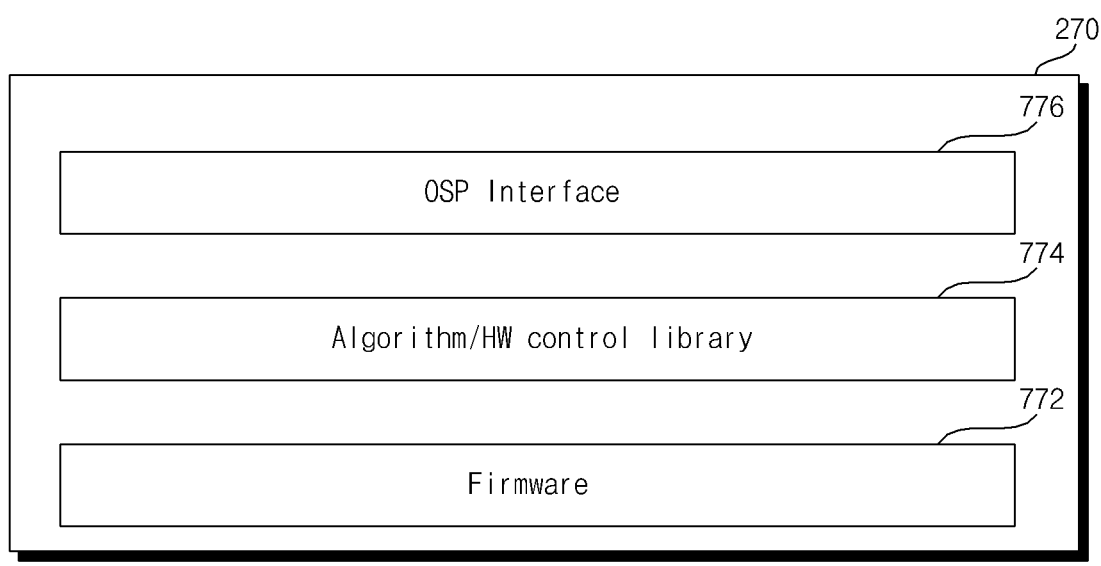

FIG. 7B is a diagram illustrating a platform architecture executed in the first processor 270 inside the first circuit PBa.

Referring to FIG. 7B, the first processor 270 inside the first circuit PBa can execute an interface 776 for communication with the third presser 270c, a firmware 772, and a library 774 for load control or operation mode control that is executed on the firmware 772.

Thus, the update of the firmware or the upgrade of the operation mode can be efficiently performed by separating the load control driven based on the firmware and the operation mode control executed based on the operating system.

FIGS. 8A to 8D are diagrams illustrating a platform architecture in various home appliances.

Figure 8A:
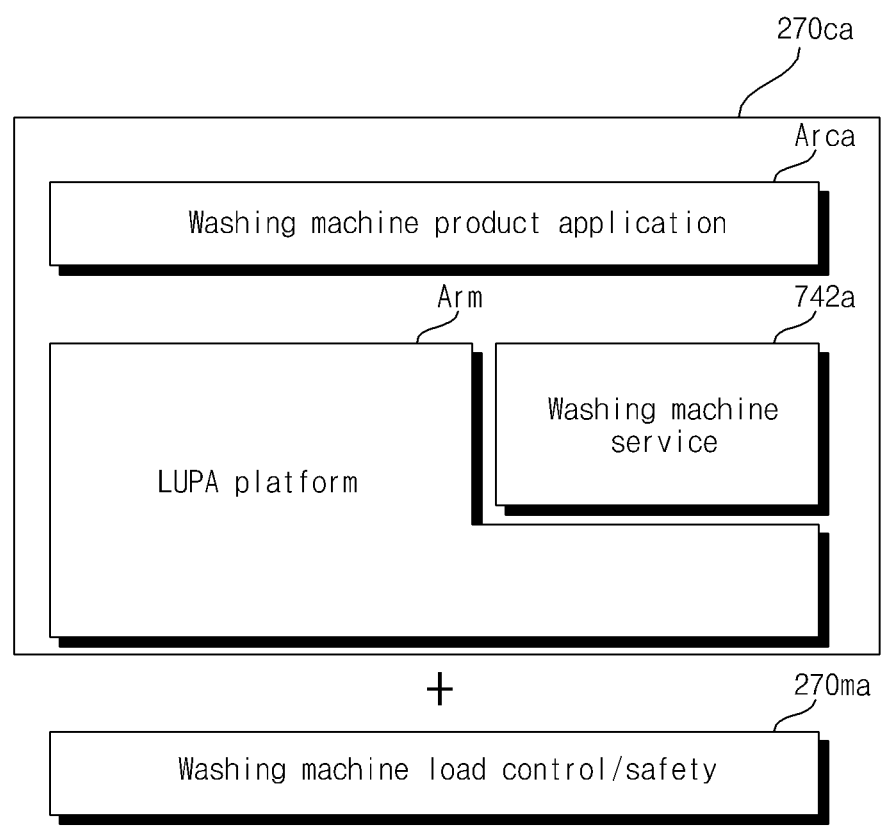

FIG. 8A shows the platform architecture of the washing machine.

Referring to FIG. 8A, a second processor 270ca in the washing machine 200a can execute a common platform Arm including an operating system and a framework, a washing machine service framework 742a, and a washing machine-related application Arca on the common platform Arm.

Meanwhile, a first processor 270ma inside the washing machine 200a can execute washing machine load control or washing machine safety control on firmware.

Figure 8B:
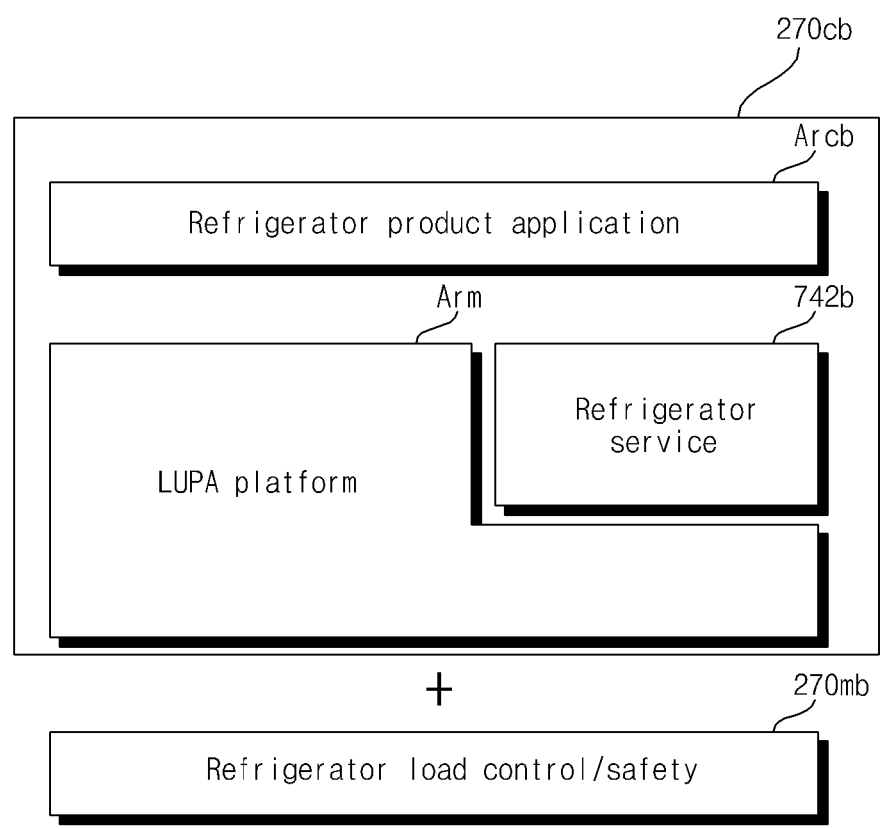

FIG. 8B shows the platform architecture of the refrigerator.

Referring to FIG. 8B, a second processor 270cb inside the refrigerator 200b can execute a common platform Arm including an operating system and a framework, a refrigerator service framework 742b, and a refrigerator related application Arcb on the common platform Arm.

Meanwhile, a first processor 270mb in the refrigerator 200b can execute refrigerator load control or refrigerator safety control on firmware.

Figure 8C:
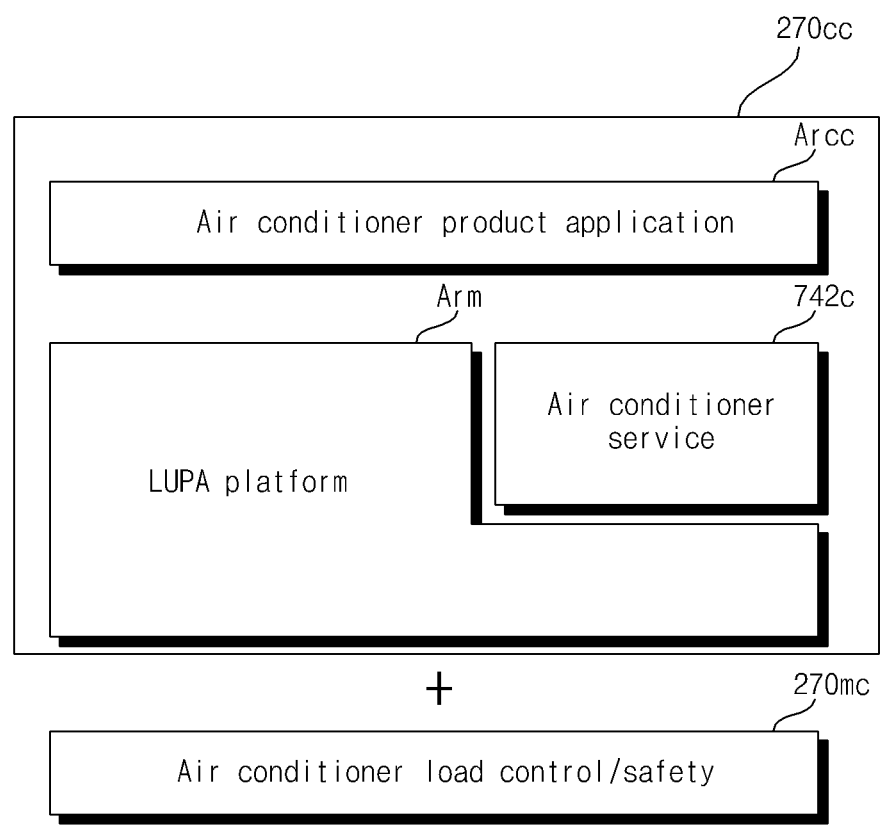

FIG. 8C shows a platform architecture of the air conditioner.

Referring to FIG. 8C, a second processor 270cc inside the air conditioner 200c can execute a common platform Arm including an operating system and framework, an air conditioner service framework 742c, and an air conditioner related application Arcc on the common platform Arm.

Meanwhile, a first processor 270mc inside the air conditioner 200c can execute air conditioner load control or air conditioner safety control on the firmware.

Figure 8D:
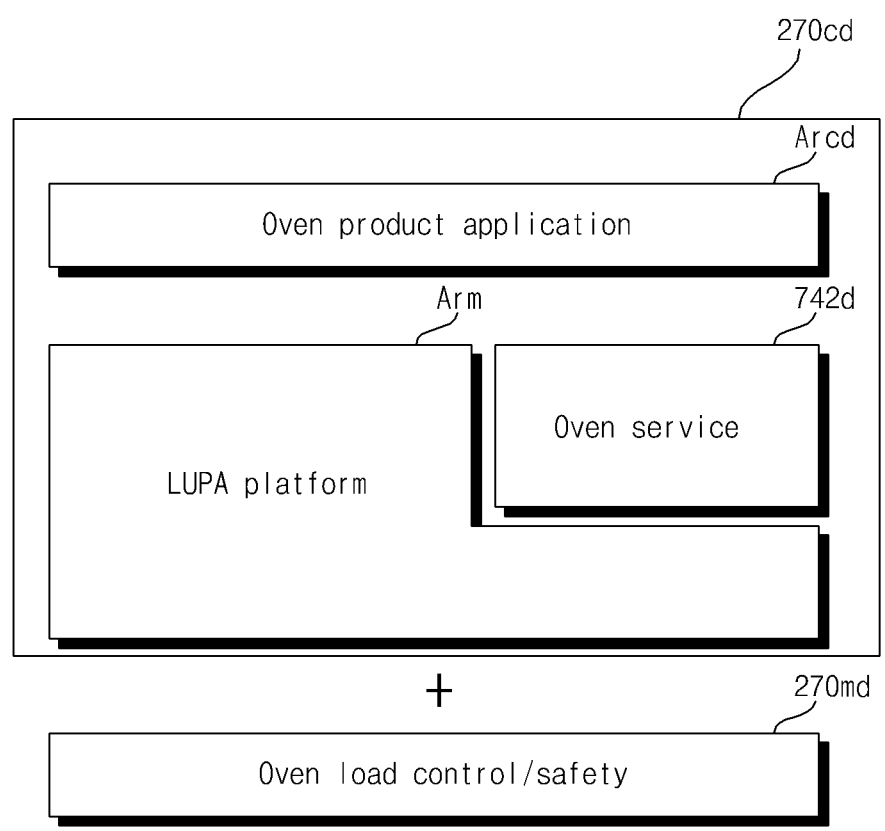

FIG. 8D shows a platform architecture of a cooking appliance.

Referring to FIG. 8D, a second processor 270cd inside the cooking appliance 200d can execute a common platform Arm including an operating system and a framework, a cooking appliance service framework 742d, and a cooking appliance-related application Arcd on the common platform Arm.

Meanwhile, a first processor 270md inside the cooking appliance 200d can execute the cooking appliance load control or the cooking appliance safety control on the firmware.

Referring to FIGS. 8A to 8D, since various types of home appliances 200 can be operated based on a common platform Arm, the update can be efficiently performed. In addition, the upgrade of the operation mode can be performed efficiently by separating the load control and the operation mode control.

Figure 9A:
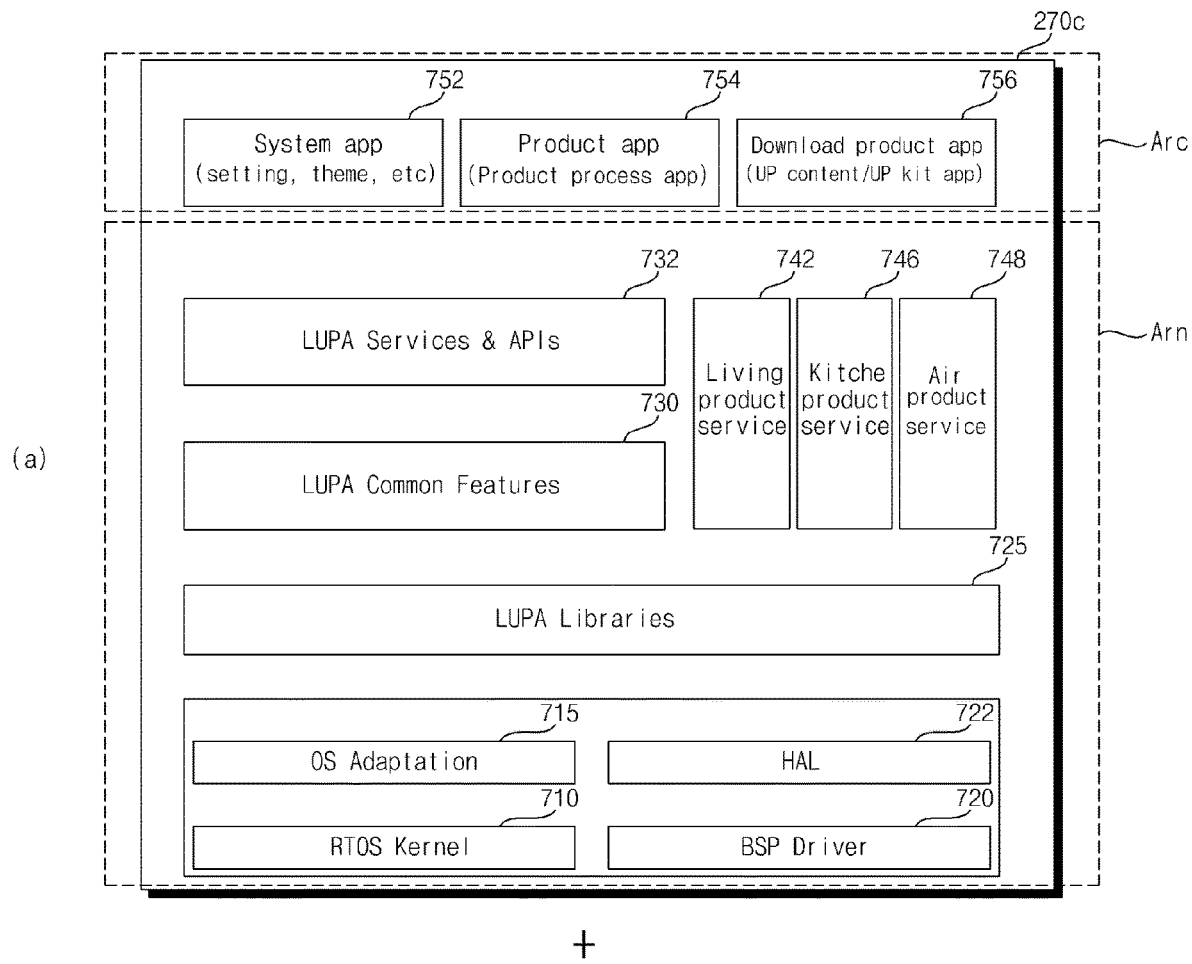
Figure 9A:
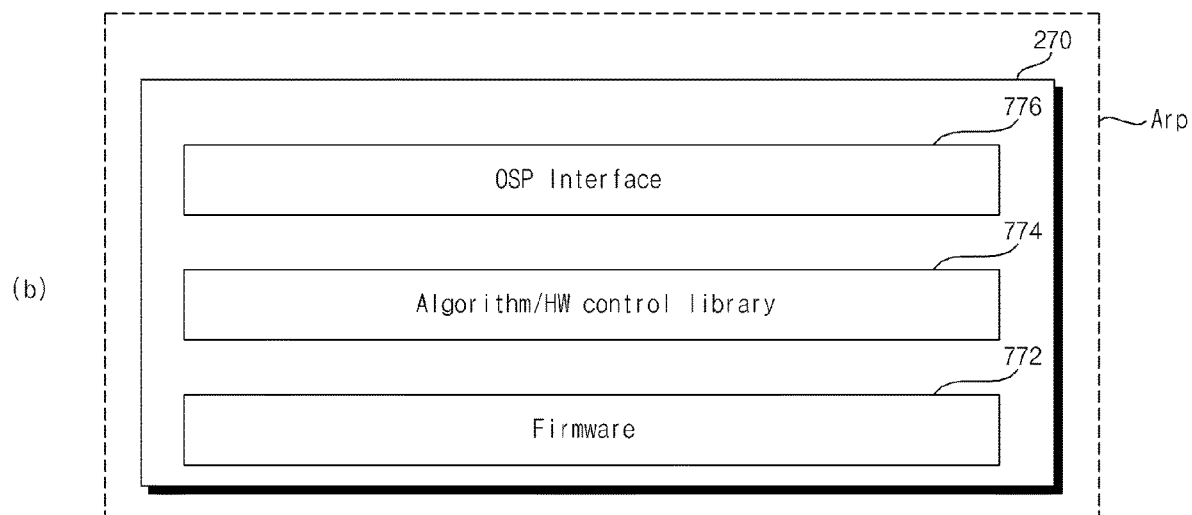

FIG. 9A is a diagram for dividing a software update area and a firmware update area and the first processor 270, among platforms executed by the second processor 270c.

Referring to FIG. 9A, the platform executed by the second processor 270c inside the second circuit PBc can be divided into a board support package layer Ara including an operating system, a framework layer Arb on the board support package layer Ara, and an application layer Arc on the framework layer Arb.

In the second processor 270c, an area where software over-the-air SOTA) is possible can be the application layer Arc, and an area Arn where firmware over the air (FOTA) is possible can be the board support package layer Ara and the framework layer Arb.

Meanwhile, in the first processor 270, there is no area where software update is possible, and the area Arp where the firmware update is possible can be an interface 776 for communication with the third processor 270c, the firmware 772, and the library 774.

As shown in FIG. 9A, the software update can be performed more efficiently and frequently by separating the software update area and the firmware update area.

Examples of the software update can be an update of a laundry process application, an enhanced dehydration application, an automatic detergent input application, a sound source theme application, a background theme application, and the like.

The software update can be an update based on a user's selection using the mobile terminal 600 or an update provided by a manufacturer.

Meanwhile, it is preferable that the firmware update is performed intermittently in comparison with a software update, and can be, for example, an operating system update, a framework update, a firmware update, a load control algorithm update, a safety control algorithm update, and the like.

Meanwhile, the operating system 710 or the framework Arb can be updated based on the firmware update information received from the server 500 or the mobile terminal 600, and the system application 752, the application 754 related to the operation mode, or the download application 756 can be updated based on the firmware update information or software update information received from the server 500 or the mobile terminal 600. Thus, the update or upgrade can be efficiently performed by separating the firmware update and the software update.

Meanwhile, the second processor 270c can control the update of the operating system 710 and the firmware update of the first circuit PBa to be performed independently. Accordingly, the update of the operating system 710 and the update of the firmware of the first circuit PBa can be efficiently performed.

Meanwhile, when the update data of the operating system 710 and the firmware update data of the first circuit PBa are received, the firmware of the first circuit PBa can be updated after the operating system 710 is updated. Thus, the update of the firmware of the first circuit PBa can be performed stably and efficiently by performing the update of the operating system 710 first.

Meanwhile, the first circuit part PBa or the third circuit part PBb can be updated, based on the firmware update information received from the server 500 or the mobile terminal 600, and the second circuit PBc can be updated based on the firmware update information or software update information received from the server 500 or the mobile terminal 600. Thus, the update of firmware or the upgrade of operation mode can be performed efficiently by separating the load control driven based on the firmware and the operation mode control executed based on the operating system 710.

Meanwhile, when the transceiver 222 receives the firmware update information from the server 500 or the mobile terminal 600, the second processor 270c can control the firmware update information to be transmitted to the memory 240a in the first circuit PBa, and the memory 240a in the first circuit PBa can update the firmware based on the firmware update information. Accordingly, the firmware update can be efficiently performed.

Meanwhile, the memory 240a inside the first circuit PBa may not update the firmware during the operation mode, but can update firmware after the operation mode is terminated. Accordingly, the firmware update can be stably performed.

Meanwhile, when the transceiver 222 receives the software update information from the server 500 or the mobile terminal 600, the second processor 270c controls the software update information to be transmitted to the memory 240 inside the second circuit PBc, and the memory 240 inside the second circuit PBc can update the application based on the software update information. Accordingly, the software update can be efficiently performed.

Meanwhile, the memory 240 inside the second circuit PBc can update application excluding the operating system 710 and the framework Arb among software, during the operation mode. Accordingly, the application update can be performed immediately.

Meanwhile, the memory 240 inside the second circuit PBc may not upgrade a new operation mode during the operation mode, and can upgrade the new operation mode after the operation mode is terminated. Accordingly, the new operation mode can be upgraded stably.

Meanwhile, the memory 240 inside the second circuit PBc may not update the operating system 710 or the framework Arb during the operation mode, but can update the operating system 710 or the framework Arb after the operation mode is terminated. Accordingly, the update of the operating system 710 or framework Arb can be performed stably.

Figure 9B:
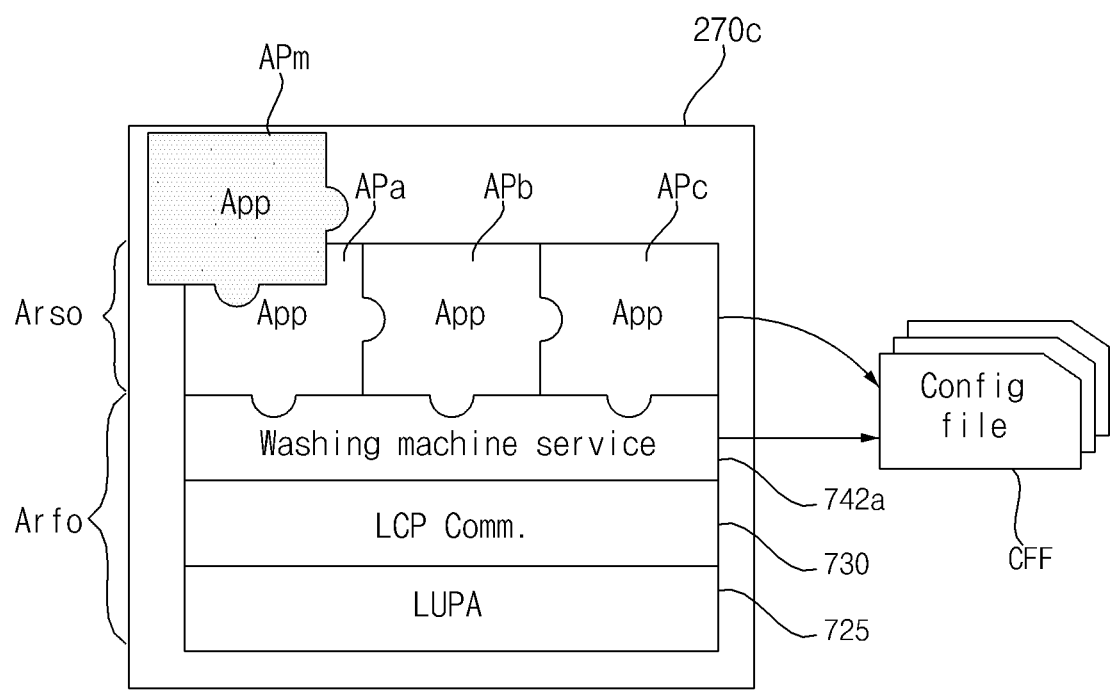

FIG. 9B is a diagram illustrating a software update in the second processor 270c inside the washing machine 200a.

Referring to FIG. 9B, the second processor 270c inside the washing machine 200a can execute an upgradable platform library 725 inside a common platform that includes an operating system, a common functional layer 730 on the upgradeable platform library 725, a washing machine service framework 742a on the common functional layer 730, and a plurality of washing machine-related applications APa, APb, APc on the washing machine service framework 742a.

In order to update the first washing machine-related application APa among the first to third washing machine-related applications APa, APb, APc, application update information is received from the server 500 or the like.

In this case, the application update information can be a fourth washing machine-related application APm for replacing a first washing machine-related application APa.

Accordingly, instead of the first washing machine-related application APa, the fourth washing machine-related application APm can be easily replaced and executed.

Meanwhile, the second processor 270c according to the present disclosure performs super-loop dependency separation for blocking for each function, and performs an event-driven inter-processor communication to minimize processor occupancy.

Meanwhile, the second processor 270c according to the present disclosure can communicate with the first processor 270 or the third processor 270b based on a variable packet method.

Meanwhile, the first processor 270 can periodically transmit sensor data sensed by the load driver 245 or the like to the second processor 270c through the inter-processor communication.

In this case, it is preferable that the first processor 270 transmits the sensor data to the second processor 270c through the inter-processor communication, only when there is a change in the sensor data by a certain value or more.

In addition, the first processor 270 can compress and serialize the sensor data instead of raw data, and transmit it to the second processor 270c.

Accordingly, the second processor 270c minimizes communication between the first processor 270 or the third processor 270b, thereby enabling efficient operation.

Specifically, the second processor 270c can perform a remote procedure call communication, which is an example of inter-processor communication, rather than a low-speed communication such as UART or SPI, in which high-speed communication is difficult due to noise or interference, thereby enabling high-speed communication.

Figure 9C:
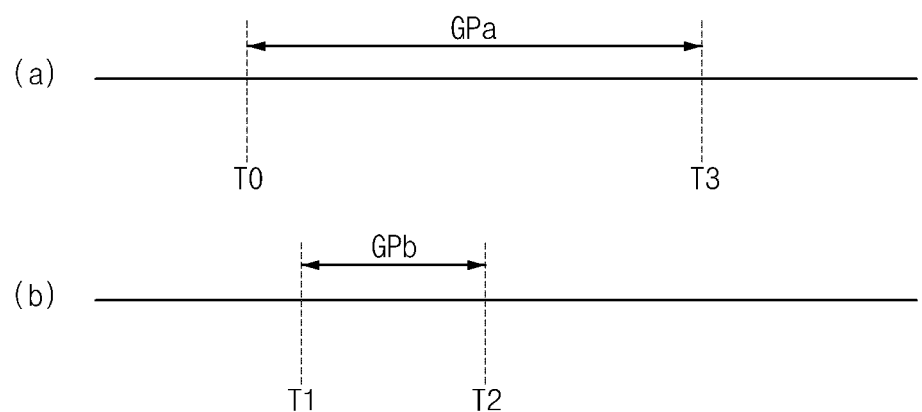

FIG. 9C is a diagram illustrating a software update interval and a firmware update interval.

Referring to FIG. 9C, it is preferable that a reception interval of the software update information received from the server 500 or the mobile terminal 600 is shorter than a reception interval of the firmware update information.

That is, the software update interval can be GPb between T1 and T2, and the firmware update interval can be GPa, between T0 and T4, greater than GPb. Accordingly, the software update can be performed frequently and simply.

Meanwhile, it is preferable that the update interval GPb of the second circuit PBc is shorter than the update interval GPa of the first circuit PBa or the update interval of the third circuit PBb. Accordingly, the update of the second circuit PBc can be performed frequently and efficiently.

Meanwhile, when the home appliance 200 is a first product, for example, a washing machine 200a, the second processor 270c executes the operating system 710, executes the common framework Arb in a part on the operating system 710, executes the first product framework 742a, which is a washing machine service framework, in another part on the operating system 710, and executes a first product-related application, for example, a washing machine-related application, on the common framework Arb and the first product framework 742a.

Meanwhile, when the home appliance 200 is a second product, i.e., the air conditioner 200c, the second processor 270c can execute the operating system 710, execute the common framework Arb in a part on the operating system 710, execute the second product framework 742c which is an air conditioner service framework in another part on the operating system 710, and can execute an application related to a second product, for example, to an air conditioner on the common framework Arb and the second product framework 742c. Accordingly, the washing machine 200a and the air conditioner 200c can be operated based on a common platform.

Meanwhile, the second processor 270c can control the first product-related application to be updated during operation of the first product, and can control the operating system 710 or the common framework Arb to be updated, after the operation of the first product is terminated.

Specifically, the second processor 270c can control a washing machine-related application to be updated during operation of the washing machine 200a, and can control the operating system 710 or the common framework Arb to be updated after the operation of the washing machine 200a is terminated. Accordingly, the update of the washing machine-related application can be performed immediately, thereby stably updating the operating system 710 or the framework Arb. This will be described with reference to FIGS. 10A to 10D.

Figure 10A:
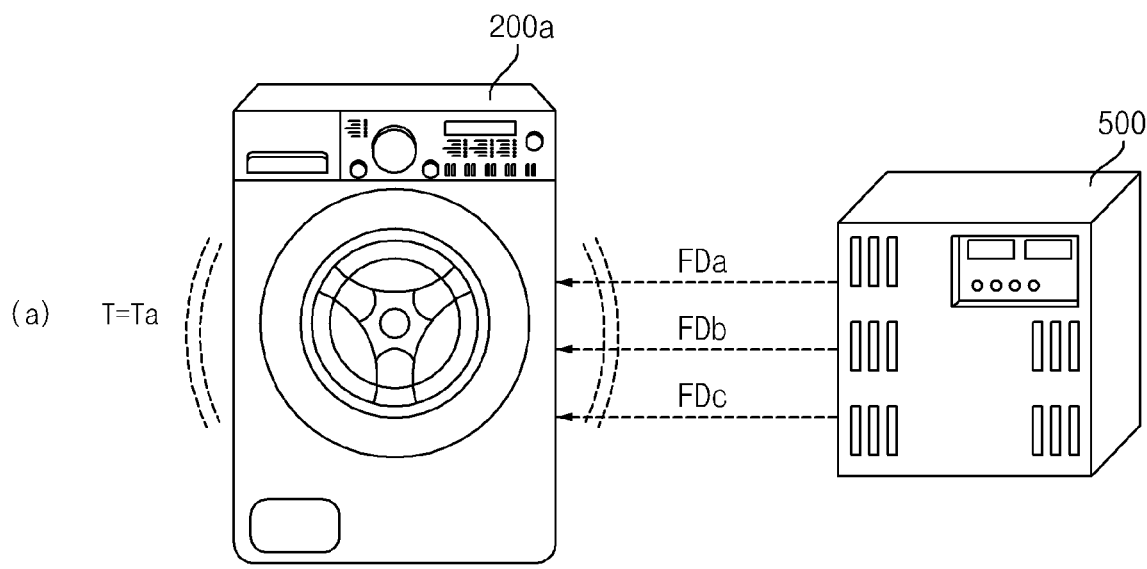
Figure 10A:
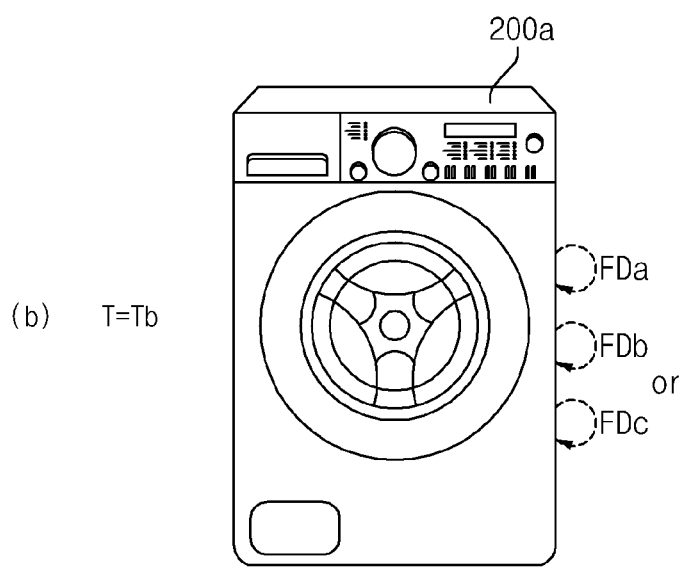

FIG. 10A is a diagram illustrating firmware update in the washing machine 200a.

Referring to FIG. 10A, at a first time point Ta when the washing machine 200a is operating, a first data FDa that is firmware update information or load control update information, a second data FDb that is operating system update information, or a third data FDc that is display update information from the server 500.

Since the firmware update information or load control update information, the operating system update information, the display update information, etc. are, as described above, firmware over the air (FOTA)-based data, update cannot be performed during the operation of the washing machine 200a for safety reasons, and it is preferable to perform the update after the operation of the washing machine 200a is completed.

Accordingly, at a second time point Tb after the operation mode of the washing machine 200a is terminated, update can be performed based on the first data FDa that is firmware update information or load control update information, the second data FDb that is operating system update information, or the third data FDc that is the display update information.

For example, at the second time point Tb, the memory 240a in the first circuit PBa of the washing machine 200a can be updated, based on the first data FDa that is the firmware update information or the load control update information.

As another example, at the second time point Tb, the memory 240 in the second circuit PBc of the washing machine 200a can be updated based on the second data FDb that is operating system update information.

As another example, at the second time point Tb, the third processor 27b in the third circuit PBb of the washing machine 200a can be updated based on the third data FDc that is display update information.

Figure 10B:
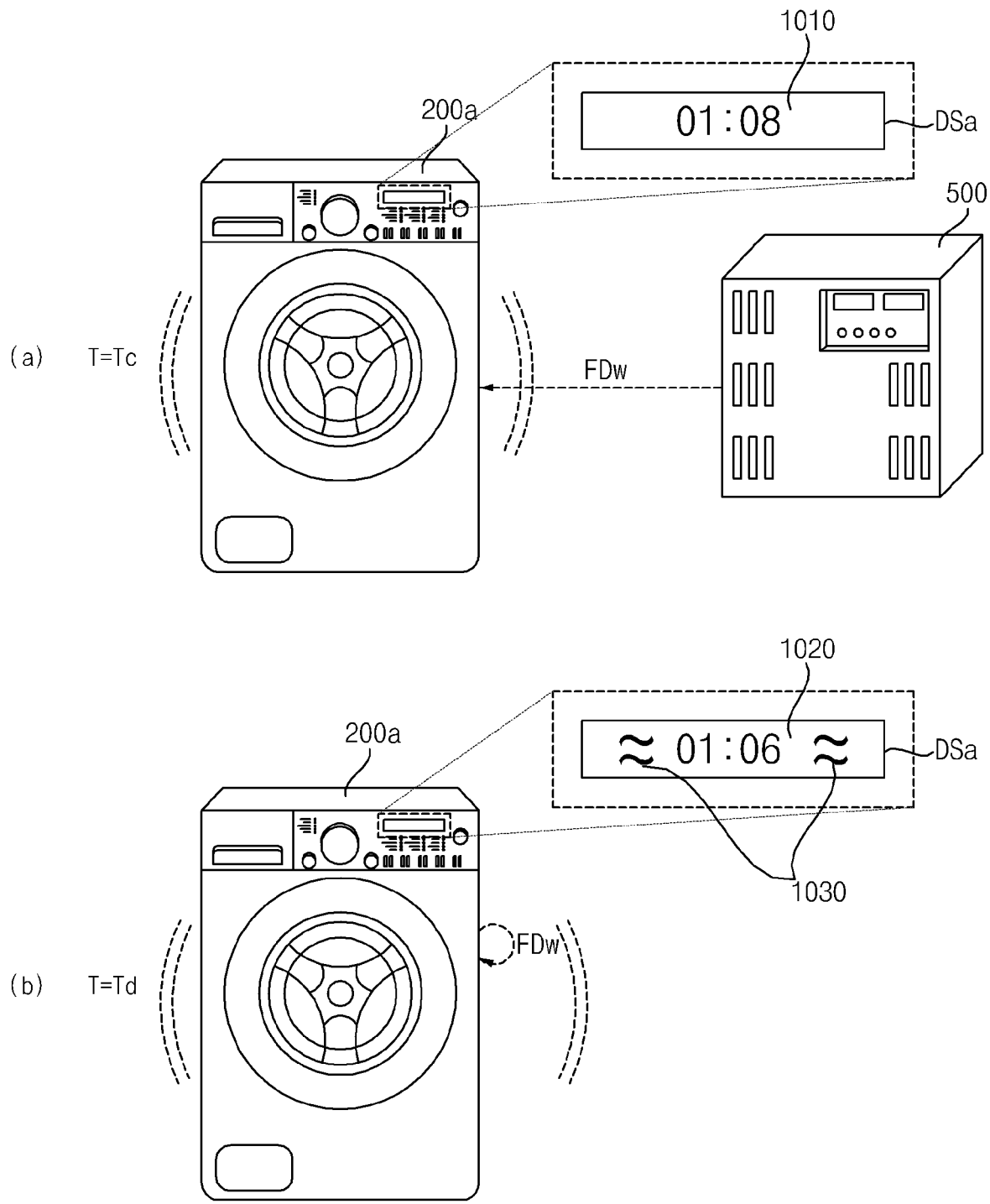

FIG. 10B is a diagram illustrating a software update in the washing machine 200a.

Referring to FIG. 10B, at a third time point Tc when the washing machine 200a is operating, a fourth data FDw that is application update information related to the washing machine can be received from the server 500.

For example, the fourth data FDw that is washing machine-related application update information can be screen theme application update information.

As described above, since the washing machine-related application update information and the like are data that can be updated through software over-the-air (SOTA), an update can be performed immediately during operation of the washing machine 200a.

Accordingly, at a fourth time point Td when the washing machine 200a is operating, the fourth data FDw-based update, which is application update information related to the washing machine, can be performed.

In the drawing, it is illustrated that, at the third time point Tc, the screen theme of the display DSa of the washing machine 200a is a first theme 1010, and it is illustrated that, at the fourth time point Td at which the update is performed, the screen theme of the display DSa of the washing machine 200a is a second theme 1020.

The first theme 1010 includes only washing machine remaining operation time information, but the second theme 1020 can further include a background theme 1030, in addition to the washing machine remaining operation time information. Accordingly, the convenience of use of the washing machine 200a can be increased.

Figure 10C:
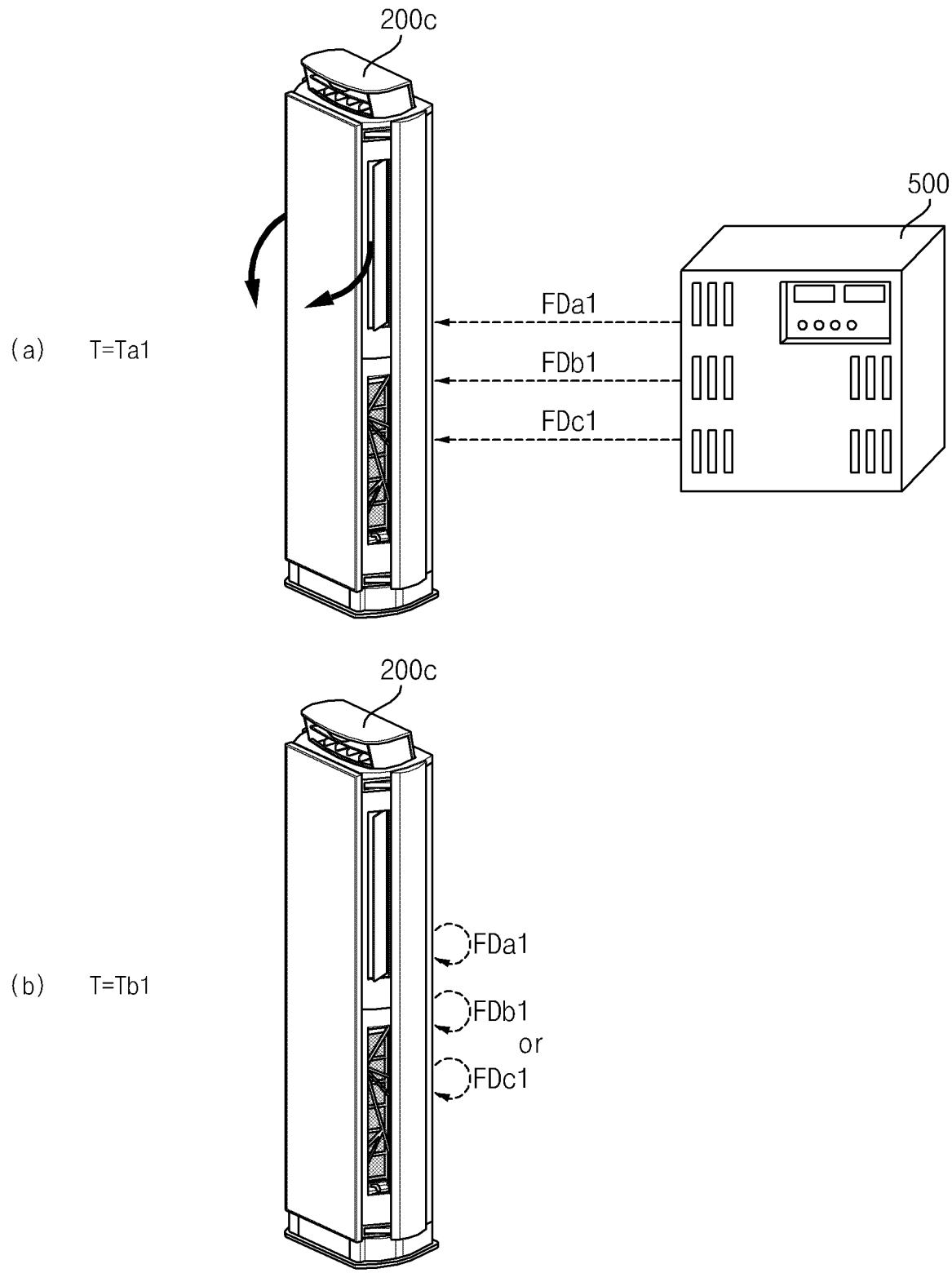

FIG. 10C is a diagram illustrating firmware update in the air conditioner 200c.

Referring to FIG. 10C, at a first time point Ta1 when the air conditioner 200c is operating, a first data FDa1 that is firmware update information or load control update information, a second data FDb1 that is operating system update information, or a third data FDc1 that is display update information can be received from the server 500.

Since the firmware update information or load control update information, the operating system update information, the display update information, etc., as described above, are firmware over the air (FOTA)-based data, the update cannot be performed during the operation of the air conditioner 200c for safety, etc., and it is preferable to perform the update after the operation of the air conditioner 200c is completed.

Accordingly, at a second time point Tb1 after the operation mode of the air conditioner 200c is terminated, an update based on the first data FDa1 that is firmware update information or load control update information, the second data FDb1 that is the operating system update information, or the third data FDc1 that is display update information can be performed.

For example, at the second time point Tb1, the memory 240a in the first circuit PBa of the air conditioner 200c can be updated, based on the first data FDa1 that is the firmware update information or the load control update information.

As another example, at the second time point Tb1, the memory 240 in the second circuit PBc of the air conditioner 200c can be updated, based on the second data FDb1 that is operating system update information.

As another example, at the second time point Tb1, the third processor 27b in the third circuit PBb of the air conditioner 200c can be updated, based on the third data FDc1 that is display update information.

Figure 10D:
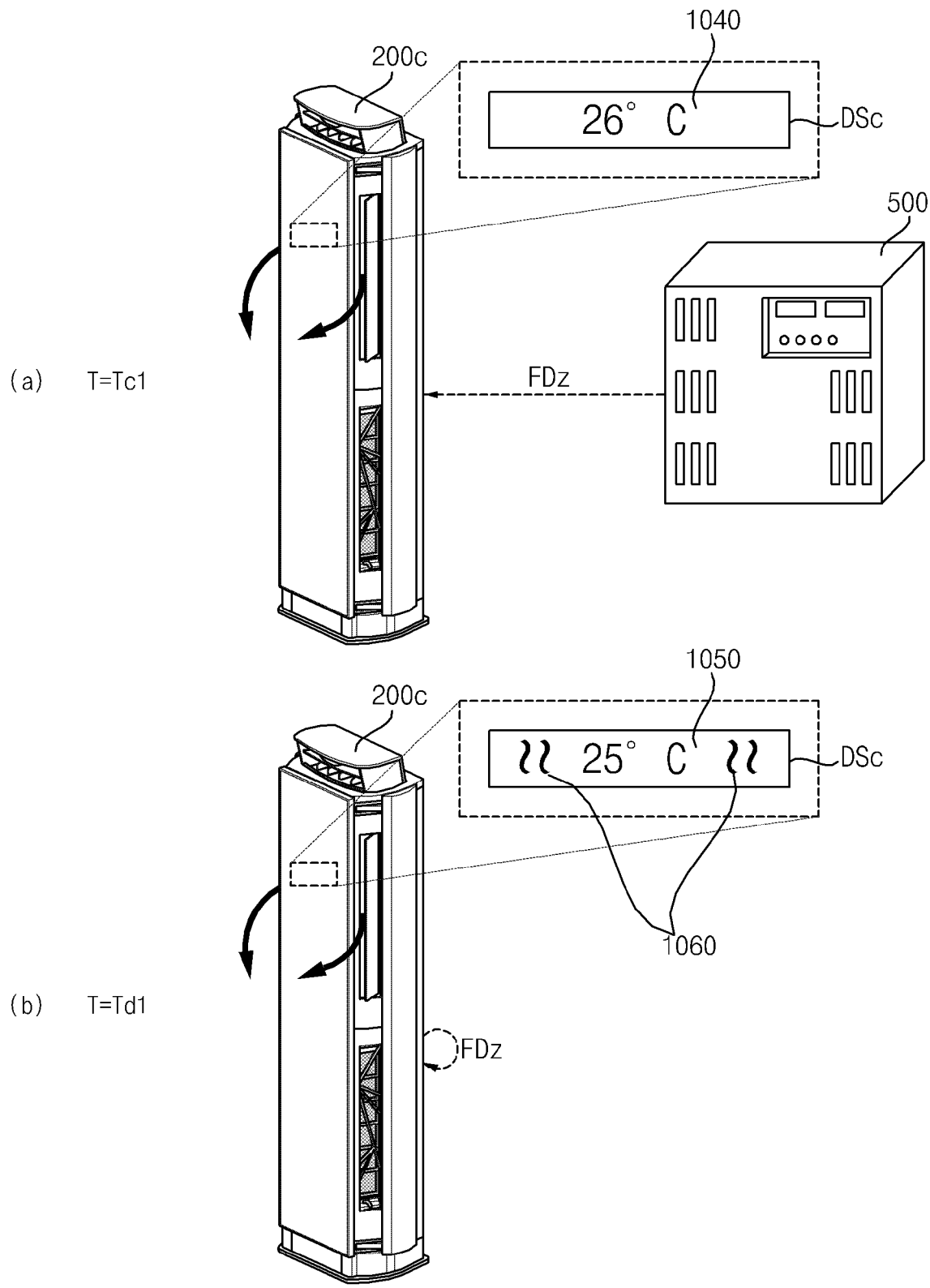

FIG. 10D is a diagram illustrating a software update in the air conditioner 200c.

Referring to FIG. 10D, at a third time point Tc1 when the air conditioner 200c is operating, a fourth data FDz that is air conditioner-related application update information can be received from the server 500.

For example, the fourth data FDz that is air conditioner-related application update information can be screen theme application update information.

As described above, the air conditioner-related application update information and the like are data that can be updated through software over-the-air (SOTA), and thus can be updated immediately during the operation of the air conditioner 200c.

Accordingly, at a fourth time point Td1 when the air conditioner 200c is operating, an update based on the fourth data FDz, which is air conditioner-related application update information, can be performed.

In the drawing, it is illustrated that, at the third time point Tc1, the screen theme of the display DSc of the air conditioner 200a is a first theme 1040, and it is illustrated that, at the fourth time point Td1 at which the update is performed, the screen theme of the display DSc of the air conditioner 200a is a second theme 1050.

The first theme 1040 includes only current indoor temperature information, but the second theme 1050 can further include a background theme 1060, in addition to the current indoor temperature information. Accordingly, the convenience of use of the air conditioner 200c can be increased.

Meanwhile, referring to FIGS. 10A to 10D, the home appliance 200 according to another embodiment of the present disclosure includes a first circuit PBa including a first processor 270 for load control or safety control, a third circuit PBb having a third processor 270b for controlling the light emitting diode 230 or the display 280, and a second circuit PBc having a second processor 270c that is connected to the first circuit PBa or the third circuit PBb by wire or wirelessly, controls the operation mode based on the operating system 710, and performs an application update during an operation mode, based on application update information received through the transceiver 222 for performing wireless communication with the external server 500 or the mobile terminal 600.

Accordingly, the upgrade of the operation mode can be performed efficiently by separating the load control and the operation mode control. In particular, an application update can be performed immediately.

Meanwhile, referring to FIG. 10B, when receiving the display theme related update information FDw from the server 500 or the mobile terminal 600, the second processor 270c can control to display a first display theme 1010, and then to perform an update based on the display theme related update information FDw during operation mode, at a first time point Ta, and to display a second display theme 1020 corresponding to the display theme related update information FDw, at a second time point Tb after the first time point Ta. Accordingly, the display theme related update can be performed immediately.

Meanwhile, referring to FIGS. 10A to 10B, the second processor 270c can control to execute the operating system 710, execute the framework Arb on the operating system 710, execute at least one application on the framework Arb, perform an update of at least one application based on the application update information FDw during operation mode, and update the operating system 710 or the framework Arb, based on the update information (FDa, FDb, or FDc) received from the server 500 or the mobile terminal 600, after the termination of the operation mode. Accordingly, it is possible to immediately perform an application update, and stably update the operating system 710 or the framework Arb.

Meanwhile, referring to FIG. 10A, after the termination of the operation mode, the second processor 270c can control to update the first circuit PBa or the third circuit PBb, based on the firmware update information (FDa or FDc) received from the server 500 or the mobile terminal 600. Accordingly, the update of the first circuit PBa or third circuit PBb can be performed stably.

Figure 11:
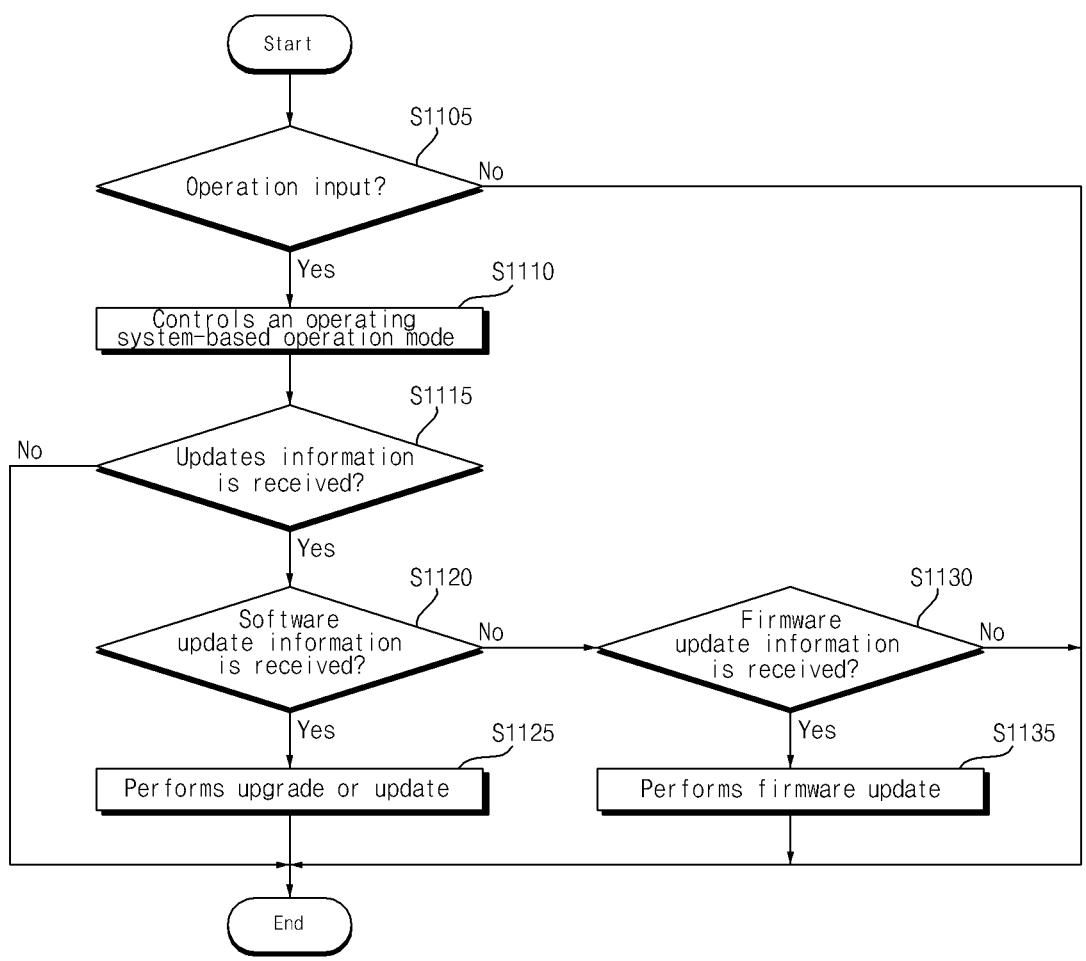
FIG. 11 is a flowchart illustrating a method of operating a home appliance according to an embodiment of the present disclosure.

FIG. 11 is a flowchart illustrating a method of operating a home appliance according to an embodiment of the present disclosure.

Referring to FIG. 11, in a standby mode, when there is an operation input corresponding to the operation of a physical handling key or an operation input by remote control (S1105), the home appliance 200 controls to cancel the standby mode, and perform an operating system-based operation mode (S1110).

For example, in the case of the washing machine 200a, the washing operation mode can be performed after the power is turned on, based on a continuous operation of a power key and an operation key.

As another example, in the case of the refrigerator 200b or the air conditioner 200c, a freezing operation or a cooling operation can be performed based on the operation of a temperature setting key.

As another example, in the case of the cooking appliance 200d, a thawing operation mode or a heating operation mode can be performed based on an operation of an operation key.

Next, during the operation mode, when update information is received (S1115), the second processor 270c determines whether the received update information is software update information (S1120), and if applicable, can perform upgrade or update (S1125).

For example, when the received software update information is update information on a new operation mode, the second processor 270c can perform upgrade, based on update information for the new operation mode, after the termination of the operation mode.

Specifically, the second processor 270c can perform the upgrade by storing the update information on a new operation mode in the memory 240, after the termination of the operation mode.

As another example, when the received software update information is information on an application, the second processor 270c can directly update the application, during the operation mode.

Meanwhile, when the received update information is not software update information at step 1120 (S1120), the second processor 270c determines whether the received update information is firmware update information (S1130).

Further, when the received update information is firmware update information, the second processor 270c performs a firmware update (S1135).

For example, when the received firmware update information is information on the operating system or the framework, the operating system or the framework can be updated after the termination of the operation mode.

As another example, when the received firmware update information is firmware update information on load control or display, the memory 240a inside the first circuit PBa or the memory 240b inside the third circuit PBb can be updated.

Accordingly, the update or upgrade based on the software update information can be efficiently performed, and the firmware update based on the firmware update information can be stably performed.

As described above, in accordance with an aspect of the present invention, a home appliance can include: a first circuit including a first processor for load control or safety control; and a second circuit connected to the first circuit by wire or wirelessly, configured to control an operation mode based on an operating system, and including a second processor configured to perform an upgrade, based on upgrade information received from an external server or a mobile terminal. Accordingly, the upgrade of the operation mode can be performed efficiently by separating the load control and the operation mode control. Specifically, the upgrade of the operation mode can be performed efficiently by separating the load control driven based on the firmware and the operation mode control executed based on the operating system. In addition, the operating system executed on the second processor can be updated.

Meanwhile, the home appliance according to an embodiment of the present disclosure can further include a third circuit including a third processor configured to control a light emitting diode or a display. Accordingly, the light emitting diode or the display can be controlled through a separate third circuit.

Meanwhile, the second processor can execute the operating system, execute a framework on the operating system, and execute a system application, an application related to the operation mode, or a download application on the framework. Accordingly, the update of the framework or the application can be performed easily and efficiently based on the operating system.

Meanwhile, a part of the operating system and the framework can correspond to a common platform. Accordingly, various types of home appliances can be operated based on a common platform. In addition, the update or upgrade can be performed efficiently by applying a common platform to the home appliances.

Meanwhile, another part of the framework, the system application, the application related to the operation mode, and the download application can correspond to a variable platform. Accordingly, the update of the variable platform or the upgrade of the driving mode can be performed efficiently.

Meanwhile, the operating system can be executed in common in other types of home appliances. Accordingly, various types of home appliances can be operated based on a common platform.

Meanwhile, the operating system or framework can be updated based on the firmware update information received from the server or the mobile terminal, and the system application, the application related to the operation mode, and the download application can be updated or upgraded, based on software update information received from the server or the mobile terminal. Thus, the update or upgrade can be efficiently performed by separating the firmware update and the software update.

Meanwhile, the update information is received from the external server or the mobile terminal, and it is preferable that a reception interval of software update information is shorter than a reception interval of firmware update information received from the server or the mobile terminal. Accordingly, the software update can be performed frequently and simply.

Meanwhile, it is preferable that the software update interval of the second circuit is shorter than the firmware update interval of the first circuit. Accordingly, the update of the second circuit can be performed frequently and efficiently.

Meanwhile, the first circuit can be updated based on firmware update information received from the server or the mobile terminal, and the second circuit can be updated based on the firmware update information or software update information received from the server or the mobile terminal. Thus, the update of the firmware or the upgrade of the operation mode can be performed efficiently by separating the load control driven based on the firmware and the operation mode control executed based on the operating system.

Meanwhile, the second processor can control the update of the operating system and the update of the firmware of the first circuit to be performed independently. Accordingly, the update of the operating system and the update of the firmware of the first circuit can be performed efficiently.

Meanwhile, when the update data of the operating system and the firmware update data of the first circuit are received, the firmware of the first circuit can be updated after the operating system is updated. Thus, the update of the firmware of the first circuit can be performed stably and efficiently by first performing the update of the operating system.

Meanwhile, the first processor can output an inverter control signal or an inverter command signal for load control. Accordingly, load control or safety control can be performed directly or indirectly by using the first processor separated from the second processor.

Meanwhile, the first circuit can be configured to perform a remote procedure call communication with the second circuit. Thus, a communication can be performed efficiently by using inter-processor communication (IPC).

Meanwhile, the first processor can perform remote procedure call communication with the second processor. Thus, a communication can be performed efficiently by using inter-processor communication (IPC).

Meanwhile, the second circuit can further include a transceiver configured to perform wireless communication with the server or the mobile terminal. Accordingly, external data can be received or data can be transmitted to the outside through the second circuit.

Meanwhile, the first circuit can further include a memory configured to store firmware for load control or safety control, and the second circuit can further include a memory configured to store the operating system. Thus, the update of the firmware or the upgrade of the operation mode can be performed efficiently by separating the load control driven based on the firmware and the operation mode control executed based on the operating system.

Meanwhile, when the transceiver receives firmware update information from the server or the mobile terminal, the second processor can be configured to transmit the firmware update information to the memory in the first circuit, and the memory in the first circuit can be configured to update the firmware, based on the firmware update information. Accordingly, the firmware update can be efficiently performed.

Meanwhile, the memory in the first circuit can be configured to not update the firmware during the operation mode, and update the firmware after the operation mode is terminated. Accordingly, the firmware update can be stably performed.

Meanwhile, when the transceiver receives software update information from the server or the mobile terminal, the second processor can be configured to transmit the software update information to the memory in the second circuit, and the memory in the second circuit can be configured to update an application, based on the software update information. Accordingly, the software update can be efficiently performed.

Meanwhile, the memory in the second circuit can update an application excluding the operating system and the framework, among software, during the operation mode. Accordingly, the application update can be performed immediately.

Meanwhile, the memory in the second circuit can update the operating system or the framework, after the operation mode is terminated, without updating the operating system or the framework, during the operation mode. Accordingly, the update of the operating system or the framework can be stably performed.

Meanwhile, in response to the home appliance being a first product, the second processor can be configured to execute an operating system, execute a common framework in a part on the operating system, execute a first product framework in another part on the operating system, and execute a first product-related application on the common framework and the first product framework. Accordingly, the first product can be operated based on the common platform.

Meanwhile, in response to the home appliance being a second product, the second processor can be configured to execute the operating system, execute a common framework in a part on the operating system, execute a second product framework in another part on the operating system, and execute a second product-related application on the common framework and the second product framework. Accordingly, the second product can be operated based on the common platform.

Meanwhile, the second processor can be configured to update the first product-related application, during operation of the first product. Accordingly, the update of the first product-related application can be immediately performed.

Meanwhile, the second processor can control the operating system or the common framework to be updated, after the operation of the first product is terminated. Accordingly, the update of the operating system or the common framework in the first product can be performed stably.

Meanwhile, it is preferable that the processing speed of the second processor is faster than the processing speed of the first processor. Accordingly, the operation mode control executed based on the operating system can be efficiently performed.

In accordance with another aspect of the present invention, a home appliance can include: a first circuit including a first processor for load control or safety control; and a second circuit connected to the first circuit by wire or wirelessly, configured to control an operation mode based on an operating system, and including a second processor configured to perform application update during the operation mode, based on application update information received from an external server or a mobile terminal. Accordingly, the update can be efficiently performed by separating the load control and the operation mode control. In particular, an application update can be performed immediately.

Meanwhile, when receiving display theme-related update information from the server or the mobile terminal, the second processor can control to display a first display theme at a first time point, perform an update based on the display theme-related update information during operation mode, and display a second display theme corresponding to the display theme-related update information, at a second time point after the first time point. Accordingly, the update related to the display theme can be performed immediately.

Meanwhile, in response to firmware update information being received from the server or the mobile terminal, the second processor can be configured to perform a firmware update, after the operation mode is terminated. Accordingly, the firmware update can be performed stably.

Meanwhile, the home appliance can further include a third circuit including a third processor configured to control a light emitting diode or a display. Accordingly, the light emitting diode or the display can be controlled through a separate third circuit.

Meanwhile, in accordance with another aspect of the present invention, a method of operating a home appliance can include: controlling an operating system-based operation mode, based on an operation input; performing update or upgrade during the operation mode, in response to software update information being received from an external server or a mobile terminal; and performing a firmware update, after the operation mode is terminated, in response to firmware update information being received from the server or the mobile terminal. Accordingly, the update or upgrade based on the software update information can be efficiently performed, and the firmware update based on the firmware update information can be stably performed.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A home appliance comprising:
    a first circuit including a first processor configured to perform load control of the home appliance or safety control of the home appliance;
    an inverter configured to convert a direct current (DC) power into an Alternating Current (AC) power for the load control;
    a second circuit connected to the first circuit by wire or wirelessly, the second circuit being configured to control an operation mode of the home appliance based on an operating system, and including a second processor configured to receive upgrade information from an external server or a mobile terminal, and perform an upgrade based on the upgrade information; and
    a third circuit including a third processor configured to control a light emitting diode of the home appliance or a display of the home appliance,
    wherein the second circuit is separate from the first circuit and the third circuit,
    wherein the second circuit is connected between the first circuit and the third circuit,
    wherein the first processor of the first circuit is configured to perform the load control or the safety control based on first sensor data from a sensor device,
    wherein the second processor of the second circuit is configured to generate an operation mode control signal for the operation mode based on second sensor data from the sensor device, and
    wherein the first processor of the first circuit is configured to output an inverter control signal or an inverter command signal for the load control.

2. The home appliance of claim 1, wherein the second processor is configured to:
    execute the operating system,
    execute a framework on the operating system, and
    execute a system application, an application related to the operation mode, or a download application on the framework.

3. The home appliance of claim 2, wherein a part of the operating system and the framework correspond to a common platform.

4. The home appliance of claim 1, wherein the second circuit is configured to receive update information from the external server or the mobile terminal, the update information including software update information or firmware update information,
    wherein a reception interval of the software update information received from the external server or the mobile terminal is shorter than a reception interval of the firmware update information received from the external server or the mobile terminal.

5. The home appliance of claim 1, wherein the second processor is configured to perform an update based on update information received from the external server or the mobile terminal, and
    wherein a software update interval of the second circuit is shorter than a firmware update interval of the first circuit.

6. The home appliance of claim 1, wherein the first circuit is updated based on firmware update information received from the external server or the mobile terminal, and
    wherein the second circuit is updated based on the firmware update information or software update information received from the external server or the mobile terminal.

7. The home appliance of claim 1, wherein the first circuit is configured to perform a remote procedure call communication with the second circuit.

8. The home appliance of claim 1, wherein the second circuit further comprises a transceiver configured to perform wireless communication with the external server or the mobile terminal.

9. The home appliance of claim 1, wherein the first circuit further comprises a memory configured to store firmware for the load control or the safety control,
    wherein the second circuit further comprises a memory configured to store the operating system.

10. The home appliance of claim 9, wherein the second processor is configured to:
   receive firmware update information from the external server or the mobile terminal, and
   transmit the firmware update information to the memory in the first circuit, and
   wherein the memory in the first circuit is configured to update the firmware based on the firmware update information.

11. The home appliance of claim 10, wherein the memory in the first circuit is configured to:
   delay updating the firmware based on the firmware update information while the home appliance is executing the operation mode, and update the firmware based on the firmware update information after the operation mode has terminated.

12. The home appliance of claim 9, wherein the second processor is configured to:
   in response to receiving software update information from the external server or the mobile terminal, transmit the software update information to the memory in the second circuit, and
   wherein the memory in the second circuit is configured to perform a software update based on the software update information.

13. The home appliance of claim 1, wherein the second processor is configured to:
   execute the operating system,
   execute a common framework in a part on the operating system,
   execute a first product framework in another part on the operating system when the home appliance is a first product, and
   execute a first product-related application on the common framework and the first product framework.

14. The home appliance of claim 13, wherein the second processor is configured to update the first product-related application, during operation of the first product.

15. The home appliance of claim 1, wherein the second processor is configured to:
   execute the operating system,
   execute a common framework in a part on the operating system,
   execute a second product framework in another part on the operating system when the home appliance is a second product, and
   execute a second product-related application on the common framework and the second product framework.

16. A home appliance comprising;
   a first circuit including a first processor configured to perform load control of the home appliance or safety control of the home appliance;
   an inverter configured to convert a direct current (DC) power into an Alternating Current (AC) power for the load control;
   a second circuit connected to the first circuit by wire or wirelessly, the second circuit being configured to control an operation mode of the home appliance based on an operating system, and including a second processor configured to receive application update information received from an external server or a mobile terminal and perform an application update based on the application update information while the operation mode of the home appliance is being executed; and
   a third circuit including a third processor configured to control a light emitting diode of the home appliance or a display of the home appliance,
   wherein the third circuit is separate from the first circuit and the second circuit,
   wherein the second circuit is configured to update the first circuit and the third circuit,
   wherein the first processor of the first circuit is configured to perform the load control or the safety control based on first sensor data from a sensor device,
   wherein the second processor of the second circuit is configured to generate an operation mode control signal for the operation mode based on second sensor data from the sensor device, and
   wherein the first processor of the first circuit is configured to output an inverter control signal or an inverter command signal for the load control.

17. The home appliance of claim 16, wherein the second processor is configured to:
   in response to receiving firmware update information from the external server or the mobile terminal, perform a firmware update based on the firmware update information after the operation mode has terminated.

* * * * *